(12) United States Patent
Yi et al.

(10) Patent No.: US 9,407,403 B2
(45) Date of Patent: Aug. 2, 2016

(54) METHOD AND APPARATUS FOR TRANSMITTING DOWNLINK DATA

(71) Applicant: LG ELECTRONICS INC., Seoul (KR)

(72) Inventors: Yunjung Yi, Anyang-si (KR); Joonkui Ahn, Anyang-si (KR); Dongyoun Seo, Anyang-si (KR)

(73) Assignee: LG ELECTRONICS INC., Seoul (JP)

( * ) Notice: Subject to any disclaimer, the term of this patent is extended or adjusted under 35 U.S.C. 154(b) by 21 days.

(21) Appl. No.: 14/381,943

(22) PCT Filed: Feb. 28, 2013

(86) PCT No.: PCT/KR2013/001674
§ 371 (c)(1),
(2) Date: Aug. 28, 2014

(87) PCT Pub. No.: WO2013/129884
PCT Pub. Date: Sep. 6, 2013

(65) Prior Publication Data
US 2015/0333880 A1    Nov. 19, 2015

Related U.S. Application Data

(60) Provisional application No. 61/604,518, filed on Feb. 29, 2012.

(51) Int. Cl.
*H04L 5/00* (2006.01)
*H04W 72/04* (2009.01)
*H04W 88/08* (2009.01)

(52) U.S. Cl.
CPC ............... *H04L 5/001* (2013.01); *H04L 5/005* (2013.01); *H04L 5/0053* (2013.01); *H04W 72/042* (2013.01); *H04L 5/0007* (2013.01); *H04W 72/0453* (2013.01); *H04W 88/08* (2013.01)

(58) Field of Classification Search
CPC . H04L 5/0007; H04L 25/0226; H04L 5/0039; H04W 48/16
See application file for complete search history.

(56) References Cited

U.S. PATENT DOCUMENTS

| | | | |
|---|---|---|---|
| 2009/0129332 A1* | 5/2009 | Dayal | H04B 7/2615 370/330 |
| 2010/0067418 A1 | 3/2010 | Parkvall et al. | |
| 2010/0260081 A1 | 10/2010 | Damnjanovic et al. | |

(Continued)

FOREIGN PATENT DOCUMENTS

KR    10-2011-0101086 A    9/2011

OTHER PUBLICATIONS

Fujitsu, "EPDCCH search space design to support narrow band operation", R1-120764, 3GPP TSG RAN WG1 #68, Dresden, Germany, Feb. 6-10, 2012.

(Continued)

*Primary Examiner* — Jung Park
(74) *Attorney, Agent, or Firm* — Birch, Stewart, Kolasch & Birch, LLP

(57) ABSTRACT

A method for transmitting downlink data in a wireless communication system is provided. A base station generates a downlink sub-frame comprising: a first control channel for a first cell having a first frequency band; and a second control channel for a second cell having a second frequency band including a part of the first frequency band. The base station transmits the downlink data through the downlink sub-frame.

5 Claims, 19 Drawing Sheets

(a) Overlapped method (a) Non-overlapped method

(56) References Cited

U.S. PATENT DOCUMENTS

2013/0195041 A1\* 8/2013 Papasakellariou .. H04W 72/042
  370/329
2014/0086188 A1\* 3/2014 Hoymann ............. H04L 5/0053
  370/329

OTHER PUBLICATIONS

Mediatek Inc., "Analysis of Reduction of Maximum Bandwidth for LTE MTC Devices", R1-120631, 3GPP TSG-RAN WG1 #68, Dresden, Germany, Feb. 6-10, 2012.

\* cited by examiner

FIG. 9
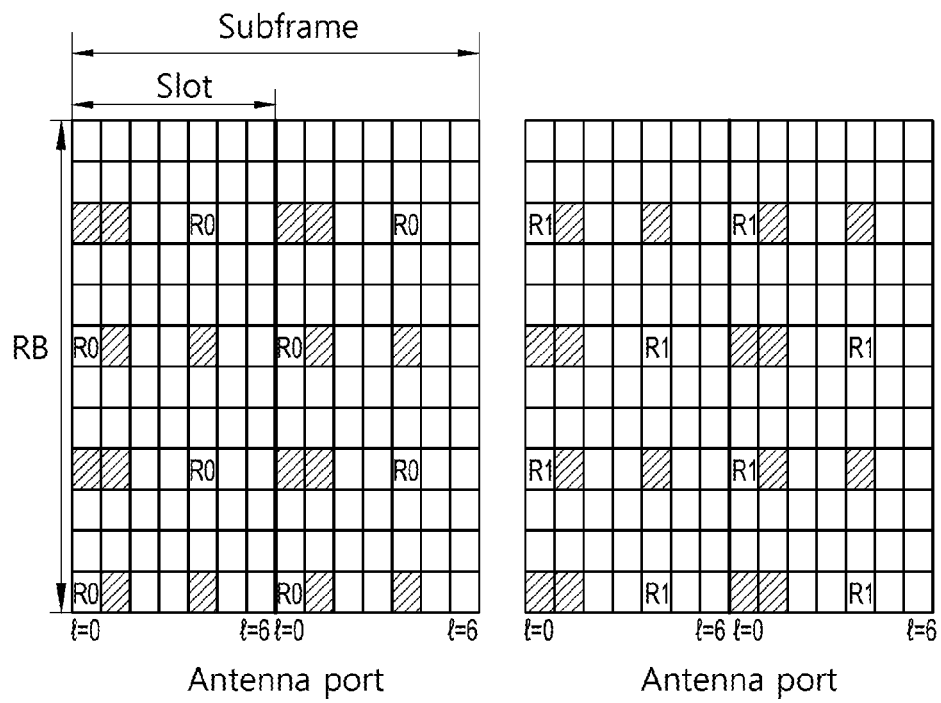
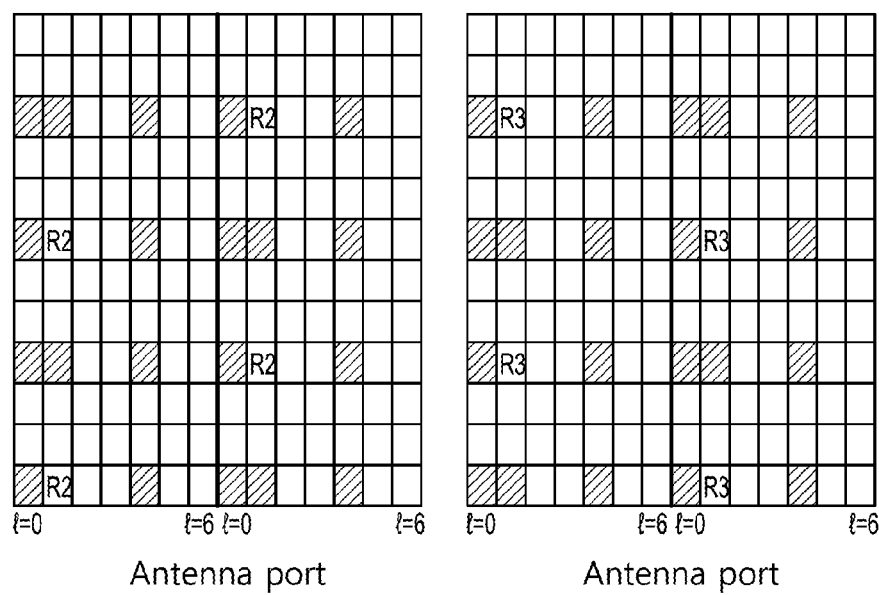

FIG. 11
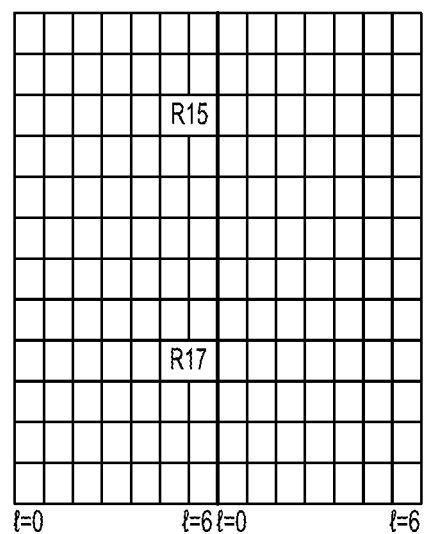
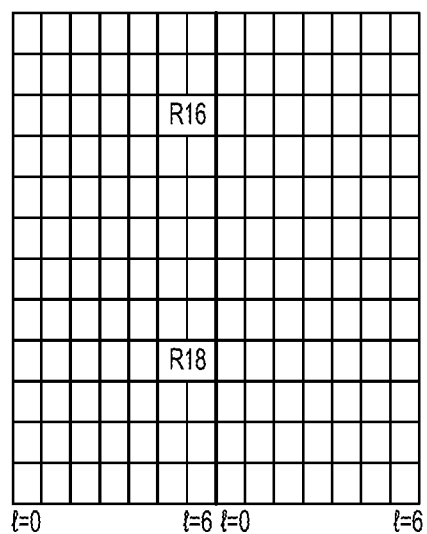
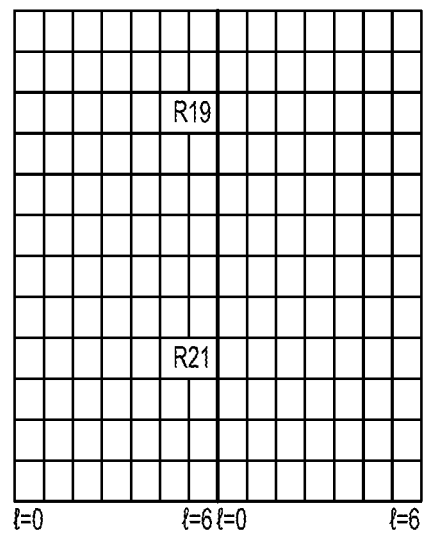
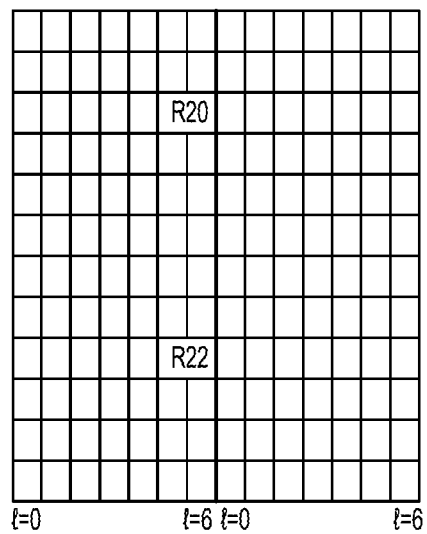

METHOD AND APPARATUS FOR TRANSMITTING DOWNLINK DATA

CROSS REFERENCE TO RELATED APPLICATIONS

This application is the National Phase of PCT International Application No. PCT/KR2013/001674, filed on Feb. 28, 2013, which claims priority under 35 U.S.C. 119(e) to U.S. Provisional Application No. 61/604,518, filed on Feb. 29, 2012, all of which are hereby expressly incorporated by reference into the present application.

BACKGROUND OF THE INVENTION

1. Field of the Invention

The present invention relates to a wireless communication system and, more particularly, to a method of sending, by a base station, downlink data for supporting narrow-band user equipment and an apparatus using the same.

2. Related Art $3^{rd}$ Generation Partnership Project (3GPP) Long Term Evolution (LTE) is an improved type of a Universal Mobile Telecommunication System (UMTS) and introduced as 3GPP release 8. 3GPP LTE uses Orthogonal Frequency Division Multiple Access (OFDMA) in downlink and uses Single Carrier-Frequency Division Multiple Access (SC-FDMA) in uplink. 3GPP LTE-advanced (LTE-A), that is, an evolved type of 3GPP LTE, is recently being discussed.

In the next systems of LTE-A, low-price/low-specification User Equipment (UE) based on data communication, such as meter reading, water-level measurement, the use of a surveillance camera, and the inventory reports of vending machines is taken into consideration. Such UE is called Machine Type Communication (MTC) UE. In MTC, the size of transmitted data is small, and the transmission and reception of data are sometimes generated. Accordingly, it is preferred that the price of a device be lowered and the consumption of a battery be reduced using such MTC characteristics.

In particular, in order to reduce the complexity of the Radio Frequency (RF) unit of MTC UE, an operating frequency bandwidth may be configured to be narrow. There is a need for a scheme for supporting MTC UE which operates in a relatively narrow band compared to existing UE.

SUMMARY OF THE INVENTION

The present invention provides a method for sending downlink data in a wireless communication system and an apparatus using the same.

The present invention provides a communication method for supporting narrow-band UE and an apparatus using the same.

In an aspect, a method for transmitting downlink data in a wireless communication system is provided. The method includes generating a downlink subframe comprising a first control channel for a first cell having a first frequency band and a second control channel for a second cell having a second frequency band, and transmitting downlink data through the downlink subframe. The second frequency band includes a part of the first frequency band.

A bandwidth of the first frequency band may be 20 MHz, and a bandwidth of the second frequency band may be 1.4 MHz.

The first cell and the second cell may have same cell identifiers.

The first control channel and the second control channel may be decoded using same cell-specific reference signal.

The first control channel may be assigned to at least one first OFDM symbol of a plurality of OFDM symbols of the downlink subframe.

The data transmission of a wireless device which operates in a relatively narrow band compared to a conventional user equipment can be supported.

BRIEF DESCRIPTION OF THE DRAWINGS

FIGS. 7 to 9 illustrate an example of a resource block to which a cell-specific RS is mapped.

FIG. 11 illustrates an example of a resource block to which a CSI-RS is mapped.

DESCRIPTION OF EXEMPLARY EMBODIMENTS

The following technologies can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data rates for GSM Evolution (EDGE). OFDMA can be implemented using radio technology, such as Institute of Electrical and Electronics Engineers (IEEE) 802.11 (Wi-Fi), IEEE 802.16 (WiMAX), IEEE 802.20, or Evolved UTRA (E-UTRA) IEEE 802.16m is the evolution of IEEE 802.16e, and it provides backward compatibility with systems based on IEEE 802.16e. UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

A User Equipment (UE) can be fixed or mobile and can also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device.

A Base Station (BS) commonly refers to a fixed station communicating with UE. The BS can also be called another terminology, such as an evolved-NodeB (eNB), a Base Transceiver System (BTS), or an access point.

Hereinafter, the present embodiment is applied to 3GPP LTE based on 3GPP release 8 or 3GPP LTE-A based on 3GPP release 10. This application is illustrative, and the present embodiment can be applied to a variety of wireless communication networks. LTE hereinafter refers to LTE and/or LTE-A.

Figure 1:
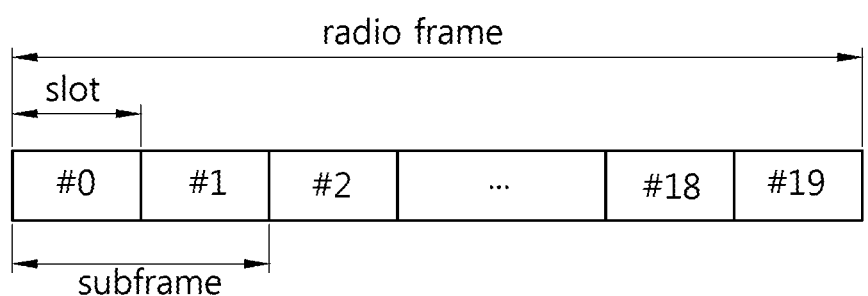
FIG. 1 shows the structure of a radio frame in 3GPP LTE.

FIG. 1 shows the structure of a radio frame in 3GPP LTE.

For the structure, reference can be made to Section 5 of a 3GPP TS 36.211 V10.3.0 (2011-12) "Technical Specification Group Radio Access Network; Evolved Universal Terrestrial Radio Access (E-UTRA); Physical channels and modulation (Release 10)".

Referring to FIG. 1, the radio frame includes 10 subframes. One subframe includes two contiguous slots. The slots within the radio frame are assigned slot numbers #0 to #19. The time that is taken to send one subframe is called a Transmission Time Interval (TTI). The TTI may be a scheduling unit for data transmission. For example, the length of one radio frame may be 10 ms, the length of one subframe may be 1 ms, and the length of one slot may be 0.5 ms.

One slot includes a plurality of Orthogonal Frequency Division Multiplexing (OFDM) symbols in a time domain and includes a plurality of subcarriers in a frequency domain. The OFDM symbol is for representing one symbol period because 3GPP LTE uses OFDMA in downlink and may be called another terminology depending on multiple access methods. For example, if SC-FDMA is used as an uplink multiple access scheme, an OFDM symbol may be called an SC-FDMA symbol. A Resource Block (RB) is a resource allocation unit, and the RB includes a plurality of contiguous subcarriers in one slot.

The structure of the radio frame shown in FIG. 1 is only an example. Accordingly, the number of subframes included in a radio frame, the number of slots included in a subframe, or the number of OFDM symbols included in a slot can be changed in various ways. In 3GPP LTE, one slot is defined to include 7 OFDM symbols in a normal Cyclic Prefix (CP), and one slot is defined to include 6 OFDM symbols in an extended CP.

Figure 2:
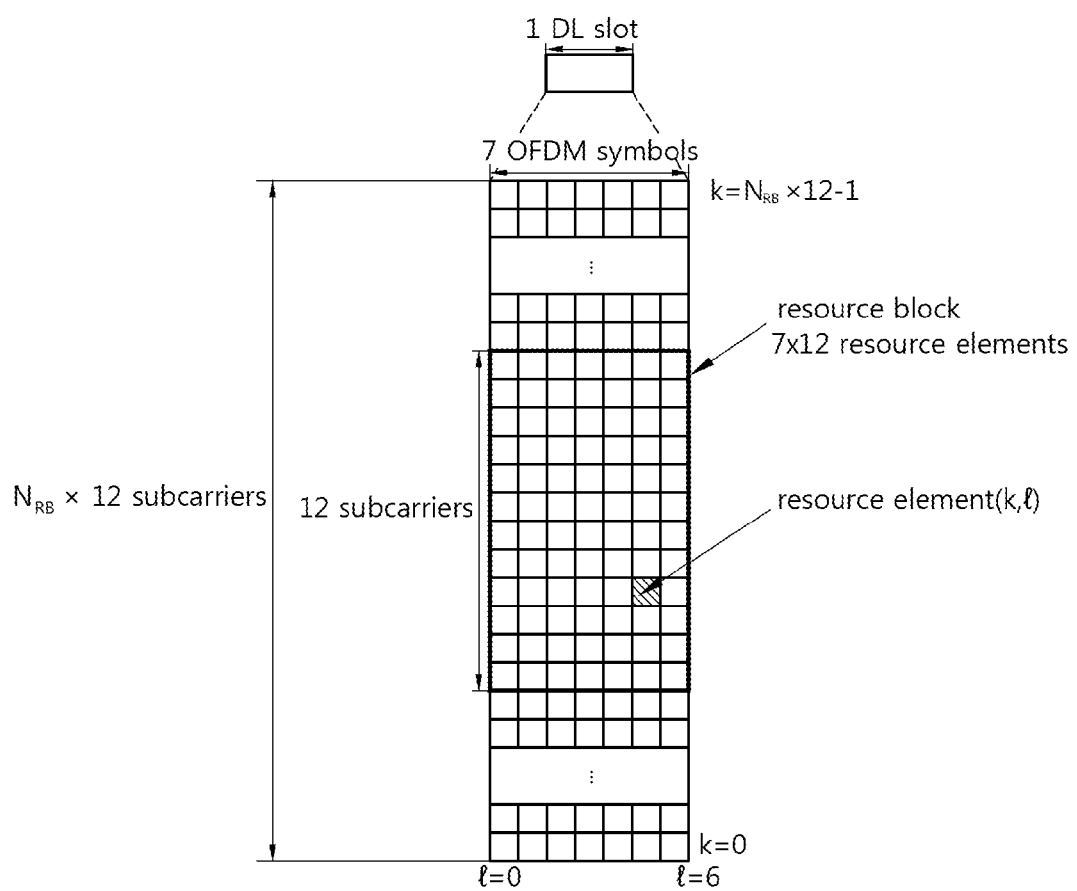
FIG. 2 shows an example of a resource grid for one downlink slot.

FIG. 2 shows an example of a resource grid for one downlink slot.

The downlink slot includes a plurality of OFDM symbols in a time domain and includes an $N_{RB}$ number of RBs in a frequency domain. The number of RBs $N_{RB}$ included in a downlink slot depends on a downlink transmission bandwidth configured in a cell. For example, in an LTE system, the number of RBs $N_{RB}$ may be any one of 6 to 110. One RB includes a plurality of subcarriers in a frequency domain. An uplink slot may have the same structure as the downlink slot.

Each element on a resource grid is referred to as a Resource Element (RE). The RE on the resource grid can be identified by an index pair (k,l) within a slot. Here, k (k=0, ..., $N_{RB}$×12-1) is a subcarrier index within a frequency domain, and l (l=0, ..., 6) is an OFDM symbol index within a time domain.

In the present invention, one RB is illustrated as including 7×12 REs, including 7 OFDM symbols in a time domain and 12 subcarriers in a frequency domain, but the number of OFDM symbols and the number of subcarriers within an RB are not limited thereto. The number of OFDM symbols and the number of subcarriers can be changed in various ways depending on the length of a CP, frequency spacing, etc.

Figure 3:
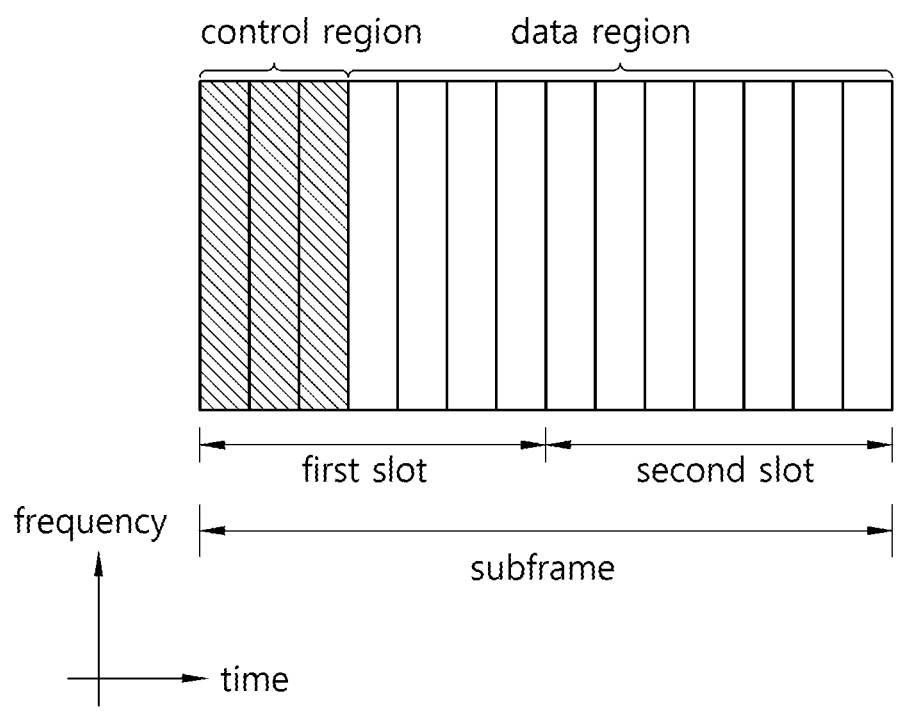
FIG. 3 shows the structure of a downlink subframe.

FIG. 3 shows the structure of a downlink subframe.

A downlink (DL) subframe is divided into a control region and a data region in a time domain. The control region includes a maximum of former 3 OFDM symbols in a first slot within the DL subframe, but the number of OFDM symbols included in the control region may be changed. Control channels different from a physical downlink control channel (PDCCH) are allocated to the control region, and PDSCHs are allocated to the data region.

As described in 3GPP TS 36.211 V10.4.0, physical channels for 3GPP LTE/LTE-A includes a PDCCH, a physical control format indicator channel (PCFICH), physical hybrid-ARQ indicator channel (PHICH), etc. Further, control signals in a physical layer includes a primary synchronization signal (PSS), a secondary synchronization signal (SSS), a random access preamnle, etc.

A PSS can be transmitted in a last OFDM symbol of a first slot (a first slot of a first subframe having an index 0) and a last OFDM symbol of an 11th slot (a first of a sixth subframe having an index 5). The PSS can used to acquire OFDM symbol synchronization and slot synchronization and is associated with a physical cell identifier. A primary synchronization code (PSC) can be used for a sequence of the PSS. There are 3 PSCs in 3GPP LTE. One of the 3 PSCs can be transmitted as the PSS according to the physical cell identifier. Same PSCs are used to the last OFDM symbol of the first slot and the last OFDM symbol of the 11th slot.

A SSS can include a first SSS and a second SSS. The first SSS and the second SSS are transmitted OFDM symbols contiguous with OFDM symbols in which the PSS is transmitted. The SSS is used to acquire frame synchronization. The SSS is also used to acquire the cell identifier together with the PSS. Different secondary synchronization codes (SSCs) are used for the first SSS and the second SSS. If the first SSS and the second SSS include 31 subcarriers, two SSC sequences having a length 31 are used for the first SSS and the second SSS respectively.

A PCFICH that is transmitted in a first OFDM symbol of a subframe carries a number of OFDM symbols used for a transmission of control channels in the subframe. The PCFICH carries a control format indicator (CFI) that indicates a size of a control region. A UE receives the CFI on the PCFICH and then monitors the PDCCH. The Blind coding is not used for PCFICH but fixed resources are used for PCFICH.

A PHICH carries a ACK/NACK signal for uplink HARQ. The ACK/NACK signal for UL data on PUSCH is transmitted on PHICH.

Control information transmitted through a PDCCH is called Downlink Control Information (DCI). DCI can include information about the resource allocation of a PDSCH (this is also called a DL grant), the resource allocation of a PUSCH (this is also called an UL grant), a set of transmit power control commands for each UE within a specific UE group, and/or the activation of a Voice over Internet Protocol (VoIP).

A BS determines a PDCCH format based on DCI to be transmitted to UE, attaches a Cyclic Redundancy Check (CRC) to the DCI, and masks a unique identifier (this is also called a Radio Network Temporary Identifier (RNTI)) the CRC depending on the owner or use of a PDCCH.

If the PDCCH is a PDCCH for specific UE, an identifier unique to the UE, for example, a Cell-RNTI (C-RNTI) can be masked to the CRC. If the PDCCH is a PDCCH for a paging message, a paging instruction identifier, for example, a Paging-RNTI (P-RNTI) can be masked to the CRC. If the PDCCH is a PDCCH for a System Information Block (SIB), a system information identifier, for example, a System Information-RNTI (SI-RNTI) can be masked to the CRC. A Random Access-RNTI (RA-RNTI) can be masked to the CRC in order to indicate a random access response, that is, a response to the transmission of a random access preamble. A Transmit Power Control-RNTI (TPC-RNTI) is masked to the CRC in order to indicate a TPC order for a plurality of UEs.

A control region within a subframe includes a plurality of Control Channel Elements (CCEs). The CCE is a logical allocation unit used to provide a PDCCH with a coding rate depending on the state of a radio channel, and corresponds to a plurality of Resource Element Groups (REGs). The REG includes a plurality of REs. The format of a PDCCH and the number of bits of an available PDCCH are determined depending on association between the number of CCEs and a coding rate provided by the CCEs.

One REG includes 4 REs, and one CCE includes 9 REGs. In order to configure one PDCCH, {1, 2, 4, 8} CCEs may be used. Each of the elements of {1, 2, 4, 8} is called a CCE aggregation level.

The number of CCEs used for transmission of a PDDCH is determined by a BS depending on a channel condition. For example, UE having a good DL channel condition may use one CCE for transmission of a PDCCH. UE having a poor DL channel condition may use 8 CCEs for transmission of a PDCCH.

A control channel including one or more CCEs is mapped to physical resources, after interleaving is performed in unit of an REG and cyclic shift based on a cell identifier (ID) is then performed.

Figure 4:
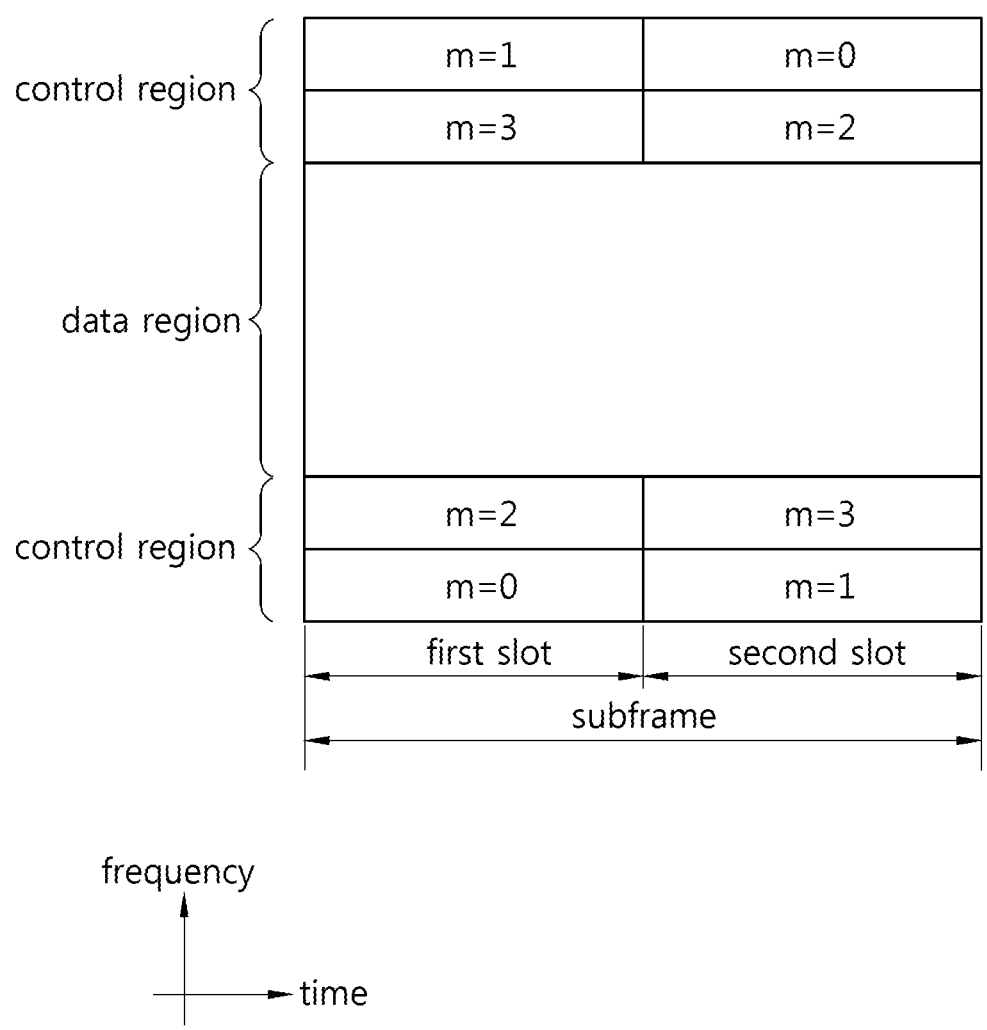
FIG. 4 shows the structure of an uplink subframe.

FIG. 4 shows the structure of an uplink subframe.

A UL subframe can be divided into a control region and a data region in a frequency domain. A physical uplink control channel (PUCCH) in which UL control information is transmitted is allocated to the control region. A physical uplink shared channel (PUSCH) in which data is transmitted is allocated to the data region.

A PUCCH for each UE is allocated in the form of a Resource Block (RB) pair in a subframe. RBs belonging to an RB pair occupy different subcarriers in a first slot and a second slot, respectively. A frequency occupied by RBs that belong to an RB pair allocated to a PUCCH is changed on the basis of a slot boundary. This is said that the RB pair allocated to the PUCCH has been frequency-hopped in the slot boundary. UE can obtain a frequency diversity gain by transmitting UL control information through different subcarriers in accordance with time. m is a location index indicative of the location of a logical frequency domain of an RB pair allocated to a PUCCH within a subframe.

UL control information transmitted on a PUCCH includes a hybrid automatic repeat request (HARQ) ACK, a Channel Quality Indicator (CQI) indicative of a DL channel condition, and a Scheduling Request (SR) indicative of an UL radio resource allocation request.

Meanwhile, as a need for a higher data throughput is increasing, a Carrier Aggregation (CA) supporting a plurality of cells can be used in 3GPP LTE-A. A CA may also be called another terminology, such as a bandwidth aggregation. A CA means that a wireless communication system configures a wideband by aggregating one or more carriers each having a smaller bandwidth than the target wideband in order to support the wideband. Target carriers for the one or more carriers may use a bandwidth used in an existing system without change for the purpose of backward compatibility with the existing system. For example, 3GPP LTE supports bandwidths 1.4 MHz, 3 MHz, 5 MHz, 10 MHz, 15 MHz, and 20 MHz, and 3GPP LTE-A can configure a wideband of 20 MHz or higher using only the bandwidths of a 3GPP LTE system. Or, a wideband may be configured by defining new bandwidths without using the bandwidths of an existing system.

A plurality of BSs and pieces of UE can communicate with one another through a maximum of 5 cells. The 5 cells can correspond to a maximum bandwidth of 100 MHz. That is, a CA environment indicates a case where specific UE has 2 or more configured serving cells (hereinafter referred to as 'cells') having different carrier frequencies. The carrier frequency indicates the center frequency of a cell.

A cell indicates a combination of DL resources and optional UL resources. That is, a cell must include DL resources and may optionally include UL resources combined with the DL resources. The DL resources may be DL Component Carriers (CCs). The UL resources can be UL CCs. If specific UE has one configured serving cell, the specific UE can have one DL CC and one UL CC. If specific UE has two or more cells, the specific UE may have the number of DL CCs equal to the number of cells and the number of UL CCs smaller than or equal to the number of cells. That is, if a CA is supported in current 3GPP LTE-A, the number of DL CCs may be always greater than or equal to the number of UL CCs. In releases after 3GPP LTE-A, however, a CA in which the number of DL CCs is smaller than the number of UL CCs may be supported.

Linkage between a carrier frequency of a DL CC and a carrier frequency of an UL CC can be indicated by system information transmitted on the DL CC. The system information can be System Information Block type2 (SIB2).

Figure 5:
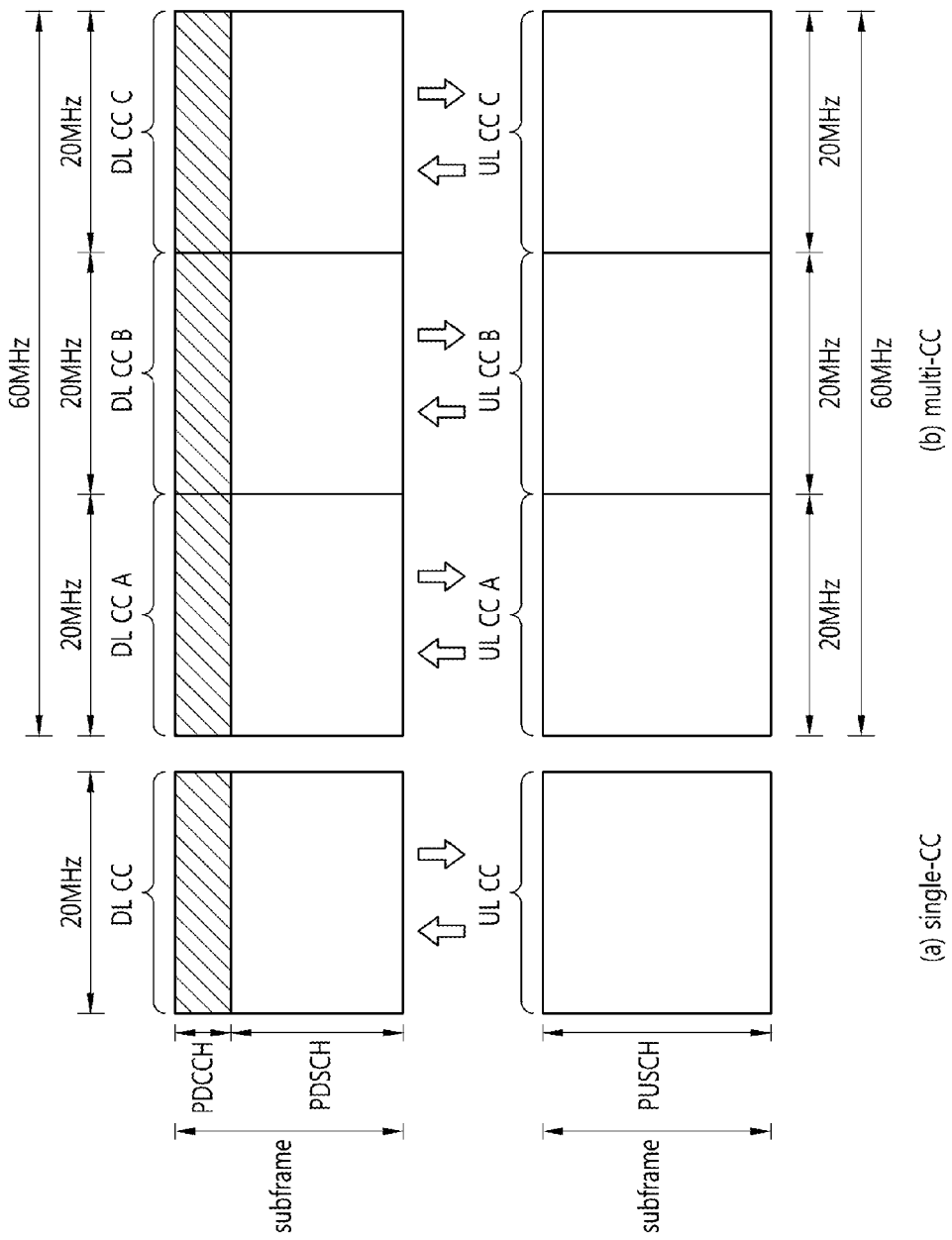
FIG. 5 shows an example of the structure of a subframe of a single carrier system and a CA system.

FIG. 5 shows an example of the structure of a subframe of a single carrier system and a CA system.

Subfigure (a) of FIG. 5 shows a single carrier system. It is assumed that a system bandwidth of subfigure (a) is 20 MHz. Since the number of carriers is 1, each of the bandwidth of a DL CC transmitted by a BS and the bandwidth of an UL CC transmitted by UE is 20 MHz. The BS performs DL transmission through the DL CC, and the UE performs UL transmission through the UL CC.

Figure 7:
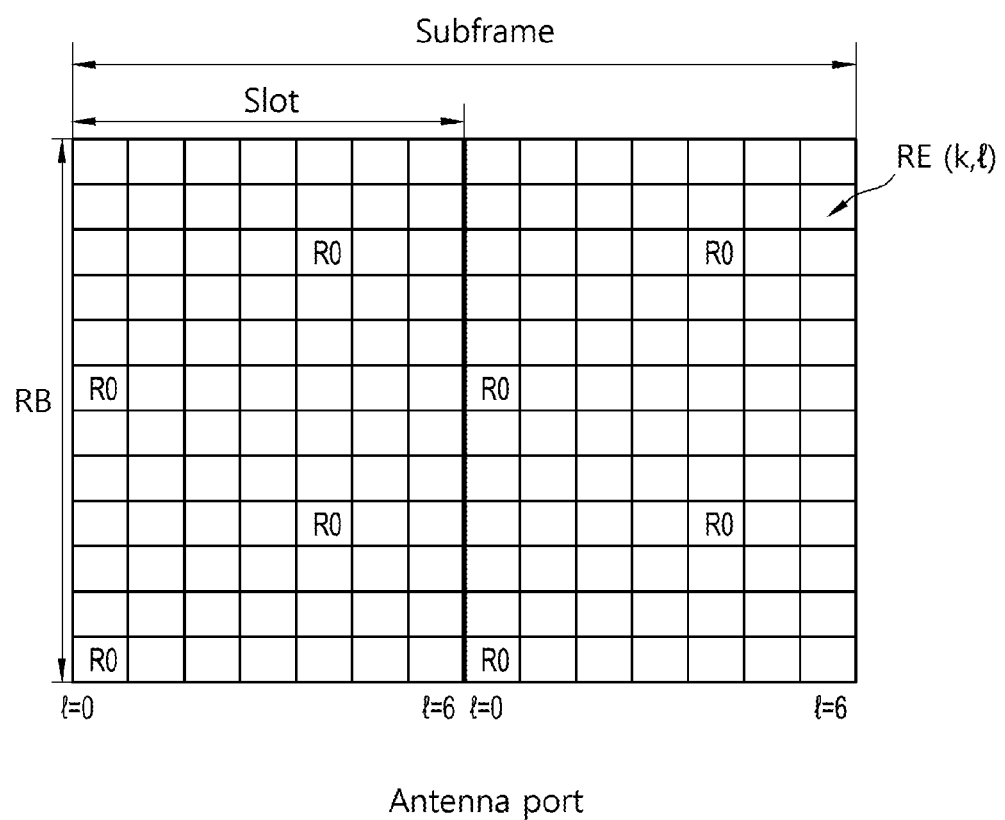

A subfigure (b) of FIG. 7 shows a CA system. It is assumed that a system bandwidth of the subfigure (b) is 60 MHz. A DL bandwidth consists of a DL CC A, a DL CC B, and a DL CC C each having a bandwidth of 20 MHz. An UL bandwidth consists of an UL CC A, an UL CC B, and an UL CC C each having a bandwidth of 20 MHz. A BS performs DL transmission through the DL CC A, the DL CC B, and the DL CC C, and UE performs UL transmission through the UL CC A, the UL CC B, and the UL CC C. Each of the DL CC A and the UL CC A, the DL CC B and the UL CC B, and the DL CC C and the UL CC C can correspond to each other.

A UE can transmit/monitor data/DL signal transmitted from a plurality of DL CCs. A BS can configure a cell/UE specific DL CC in order that the UE monitors DL signal/data transmitted through M DL CCs. M is smaller than N that the number of DL CCs managed by the BS. The BS can configure L cell/UE specific DL CC in order that the UE monitors DL signal/data transmitted through L DL CCs among M DL CCs.

A UE supporting CA can be configured for one or more CCs according to its capacity. A plurality of CCs can be managed by a MAC in order to improve efficiency. A receiver in the UE can receive DL CCs when DL CA is configured, and a transmitter in the UE can transmit UL CCs when UL CA is configured.

As a CA environment is introduced, cross-carrier scheduling can be applied. A PDCCH on a specific DL CC can schedule a PDSCH on any one of a plurality of DL CCs or schedule a PUSCH on any one of a plurality of UL CCs through cross-carrier scheduling. For the cross-carrier scheduling, a Carrier Indicator Field (CIF) can be defined. The CIF can be included in a DCI format transmitted on a PDCCH. Whether or not the CIF is present within a DCI format can be indicated by a higher layer semi-statically or UE-specifically. When cross-carrier scheduling is performed, the CIF can indicate a DL CC in which a PDSCH is scheduled or an UL CC in which a PUSCH is scheduled. The CIF may be fixed 3 bits and may be present at a fixed position irrespective of the size of a DCI format. If a CIF is not present in a DCI format, a PDCCH on a specific DL CC may schedule a PDSCH on the same DL CC or may schedule a PUSCH on an UL CC that is SIB2-connected to the specific DL CC.

If cross-carrier scheduling is performed using a CIF, a BS can allocate a PDCCH monitoring DL CC aggregation in order to reduce the complexity of blind decoding by UE. The PDCCH monitoring DL CC aggregation corresponds to some of all DL CCs, and the UE performs blind decoding on only a PDCC within the PDCCH monitoring DL CC aggregation. That is, in order to schedule a PDSCH and/or a PUSCH to UE, a BS can send a PDCCH through only DL CCs within a PDCCH monitoring DL CC aggregation. The PDCCH monitoring DL CC aggregation can be configured UE-specifically, UE group-specifically or cell-specifically.

Figure 6:
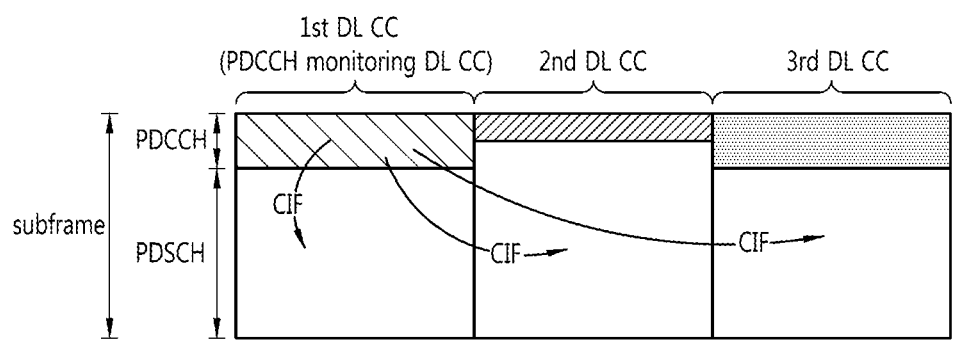
FIG. 6 shows an example of the structure of a subframe for cross-carrier scheduling through a CIF.

FIG. 6 shows an example of the structure of a subframe for cross-carrier scheduling through a CIF.

Referring to FIG. 6, a first DL CC of three DL CCs is configured as a PDCCH monitoring DL CC. If cross-carrier scheduling is not performed, each DL CCs schedules a PDSCH by sending each PDCCH. If cross-carrier scheduling is performed, only the first DL CC configured as the PDCCH monitoring DL CC transmits a PDCCH. The PDCCH transmitted on the first DL CC schedules not only the PDSCH of the first DL CC, but also the PDSCHs of a second DL CC and a third DL CC by using a CIF. The second DL CC and the third DL CC not configured as a PDCCH monitoring DL CC do not transmit PDCCHs.

Furthermore, UE can transmit UL control information, such as Channel State Information (CSI) received, detected, or measured from one or more DL CCs or an ACK/NACK signal, to a BS through one predetermined UL CC. The CSI can include a CQI, a Precoding Matrix Indicator (PMI), a Rank Indicator (RI) and so on. For example, when UE needs to transmit ACK/NACK signals for data received from a plurality of DL CCs, the UE can multiplex or bundle the plurality of ACK/NACK signals for the data received from the respective DL CCs and transmit the multiplexed or bundled ACK/NACK signal to a BS through the PUCCH of one UL CC. A case where the transmission of an ACK/NACK signal for a DL CC is necessary in 3GPP LTE includes the following three cases.

1) An ACK/NACK signal for the transmission of a PDSCH indicated by a corresponding PDCCH in a subframe n-k can be transmitted in a subframe n. k∈K, wherein K is M element sets {k0, k1, . . . , kM−1} depending on the subframe n and an UL/DL configuration. This case corresponds to a case where an ACK/NACK signal for a common PDSCH is transmitted.

2) An ACK/NACK signal for the PDCCH of a subframe n-k indicative of the release of DL Semi-Persistent Scheduling (SPS) can be transmitted in a subframe n. k∈K, wherein K is M element sets {k0, k1, . . . , kM−1} depending on the subframe n and an UL/DL configuration. An ACK/NACK signal for a PDCCH indicative of the activation of the DL SPS is not transmitted.

3) An ACK/NACK signal for the transmission of a PDCCH without a corresponding PDCCH in a subframe n-k can be transmitted in a subframe n. k∈K, wherein K is M element sets {k0, k1, . . . , kM−1} depending on the subframe n and an UL/DL configuration. This case corresponds to a case where an ACK/NACK signal for DL SPS is transmitted.

In the above description, K is called a bundling window. That is, the bundling window refers to one or more DL subframes corresponding to an ACK/NACK signal in one UL subframe. In an FDD system, M=1 and K={k0}={4}.

Meanwhile, various Reference Signals (RSs) are transmitted in a subframe.

In general, an RS is transmitted in the form of a sequence. A specific sequence may be used as an RS sequence without special limits. A Phase Shift Keying (PSK)-based computer generated sequence may be used as the RS sequence. PSK may include, for example, Binary Phase Shift Keying (BPSK) and Quadrature Phase Shift Keying (QPSK). Alternatively, a Constant Amplitude Zero Auto-Correlation (CAZAC) sequence may be used as the RS sequence. The CAZAC sequence may include, for example, a Zadoff-Chu (ZC)-based sequence, a ZC sequence with cyclic extension, and a ZC sequence with truncation. Alternatively, a pseudo-random (PN) sequence may be used as the RS sequence. The PN sequence may include, for example, an m-sequence, a computer-generated sequence, a Gold sequence, and a Kasami sequence. Alternatively, a cyclically shifted sequence may be used as the RS sequence.

A downlink RS includes a Cell-specific Reference Signal (CRS), a Multimedia Broadcast and multicast Single Frequency Network (MBSFN) RS, a UE-specific RS (URS), a Positioning RS (PRS), and a CSI-RS. The CRS is a reference signal transmitted to all pieces of UE within a cell. The CRS may be used for channel measurement for CQI feedback and channel measurement for a PDSCH. The MBSFN RS may be transmitted in a subframe assigned to MBSFN transmission. The URS is a reference signal received by specific UE within a cell or a specific UE group, and may also be called a demodulation RS (DM-RS). The DM-RS is used for specific UE or a specific UE group to demodulate data. The PRS may be used to estimate the position of UE. The CSI-RS is used for channel estimation for the PDSCH of LTE-A UE. The CSI-RS is relatively sparsely disposed in the frequency domain or the time domain, and may be punctured in the data region of a common subframe or MBSFN subframe.

The CRS is transmitted in all downlink subframes within a cell which supports PDSCH transmission. The CRS may be transmitted on antenna ports 0 to 3, and the CRS may be defined for only Δf=15 kHz. For the CSI-RS, reference may be made to Paragraph 6.10.1 of 3GPP TS 36.211 V10.4.0.

Figure 8:
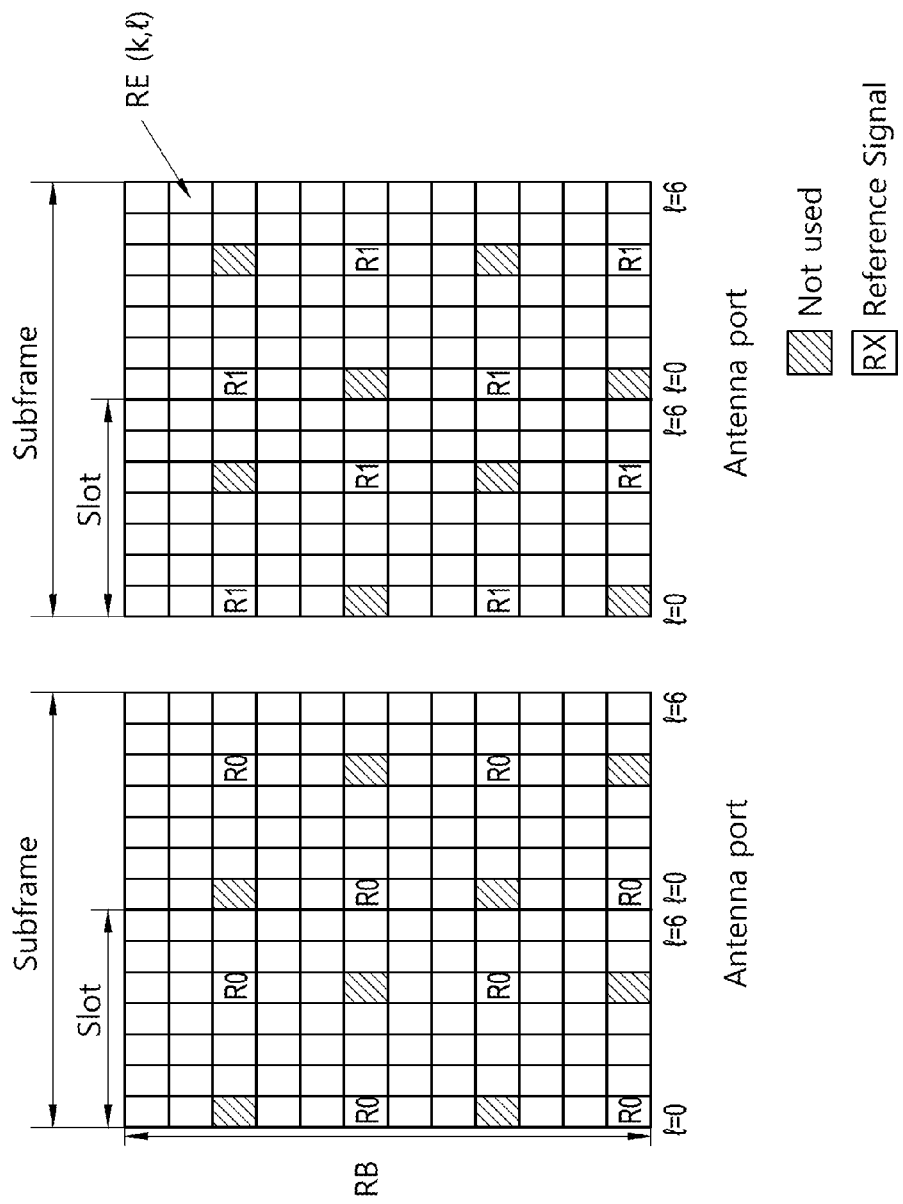

FIGS. 7 to 9 illustrate an example of a resource block to which a cell-specific RS is mapped.

FIG. 7 illustrates an example of a pattern in which a CRS is mapped to an RB when a BS uses a single antenna port, FIG. 8 illustrates an example of a pattern in which a CRS is mapped to an RB when a BS uses two antenna ports, and FIG. 9 illustrates an example of a pattern in which a CRS is mapped to an RB when a BS uses four antenna ports.

The CRS pattern may be used to support the characteristics LTE-A. For example, the CRS pattern may be used to support characteristics, such as a Coordinated Multi-Point (CoMP) transmission reception scheme or spatial multiplexing. Furthermore, the CRS may be used for the measurement of channel quality, the detection of a CP, and time/frequency synchronization.

Referring to FIGS. 7 to 9, in the case of multi-antenna transmission in which a BS uses a plurality of antenna ports, a single resource grid is present in each antenna port. 'R0' is indicative of an RS for a first antenna port, 'R1' is indicative of an RS for a second antenna port, 'R2' is indicative of an RS for a third antenna port, and 'R3' is indicative of an RS for a fourth antenna port. The positions of R0 to R3 within a subframe are not overlapped with one another. l is the position of an OFDM symbol within a slot, and l has a value between 0 and 6 in a normal CP. In a single OFDM symbol, the RS of each antenna port is placed at an interval of 6 subcarriers. The number of R0 s and the number of R1 s within the subframe are the same, and the number of R2s and the number of R3s within the subframe are the same. The number of R2s and the number of R3s within the subframe are smaller than the number of R0s and the number of R1s. An RE used in the RS of one antenna port is not used in the RS of the other antenna. The reason for this is that interference between the antenna ports is avoided.

The number of CRSs corresponding to the number of antenna ports is always transmitted regardless of the number of streams. A CRS has an independent RS in each antenna port. The position of a frequency domain and the position of a time domain within the subframe of a CRS are determined regardless of UE. A CRS sequence multiplied by a CRS is also generated regardless of UE. Accordingly, all pieces of UE within a cell may receive the CRS. However, the position of the CRS within the subframe and a CRS sequence ё may be determined based on a cell ID. The position of a time domain within the subframe of a CRS may be determined depending on the number of an antenna port and the number of OFDM symbols within a single RB. The position of a frequency domain within the subframe of a CRS may be determined depending on an antenna number, a cell ID, an OFDM symbol index l, and a slot number within a radio frame.

A CRS sequence may be applied to each OFDM symbol within a single subframe. The CRS sequence may vary depending on a cell ID, a slot number within a single radio frame, the index of an OFDM symbol within a slot, and the type of CP. The number of RS subcarriers for each antenna port on a single OFDM symbol is two. Assuming that a subframe includes $N_{RB}$ RBs in the frequency domain, the number of RS subcarriers for each antenna on a single OFDM symbol is $2 \times N_{RB}$. Accordingly, the length of a CRS sequence becomes $2 \times N_{RB}$.

An RS sequence $r_{l,ns}$ (m) for a CRS is defined as follows.

$$r_{l,ns}(m) = \frac{1}{\sqrt{2}}(1 - 2 \cdot c(2m)) + j\frac{1}{\sqrt{2}}(1 - 2 \cdot (2m + 1)) \quad \text{Equation 1}$$

In Equation 1, m is 0, 1, . . . , $2N_{RB}^{max}-1$. $2N_{RB}$ is the number of resource blocks corresponding to a maximum bandwidth. For example, in 3GPP LTE, $2N_{RB}^{max}$ is 110. c(i) is a PN sequence and a pseudo random sequence, and may be defined as a Gold sequence of length−31. Equation 2 illustrates an example of a Gold sequence c(n).

$$c(n)=(x_1(n+Nc)+x_2(n+Nc)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{Equation 2}$$

In Equation 2, $N_C$=1600, $x_1$(i) is a first m-sequence, and $x_2$(i) is a second m-sequence. For example, the first m-sequence or the second m-sequence may be initialized depending on a cell ID, a slot number within a single radio frame, the index of an OFDM symbol within a slot, and the type of CP every OFDM symbol.

In the case of a system having a bandwidth of smaller than $2N_{RB}^{max}$, only a specific part that belongs to an RS sequence generated to have a $2 \times 2N_{RB}^{max}$ length and that has a $2 \times N_{RB}$ length may be selected and used.

Frequency hopping may be applied to a CRS. A frequency hopping pattern may have a cycle of a single radio frame (10 ms), and each frequency hopping pattern corresponds to a single identity group.

A DM-RS is supported for PDSCH transmission, and is transmitted on antenna ports p=5, p=7, 8 or p=7, 8, . . . , v+6. In this case, v is indicative of the number of layers used for PDSCH transmission. A DM-RS is transmitted to a piece of UE on any one antenna port within a set S. In this case, S={7, 8, 11, 13} or S={9, 10, 12, 14}. A DM-RS is present for the demodulation of a PDSCH and valid only if it is associated with an antenna port corresponding to the transmission of a PDSCH. A DM-RS is transmitted only in an RB to which a corresponding PDSCH is mapped. A DM-RS is not transmitted in an RE in which any one of a physical channel and a physical signal is transmitted regardless of an antenna port. For the DM-RS, reference may be made to Paragraph 6.10.3 of 3GPP TS 36.211 V10.4.0.

Figure 10:
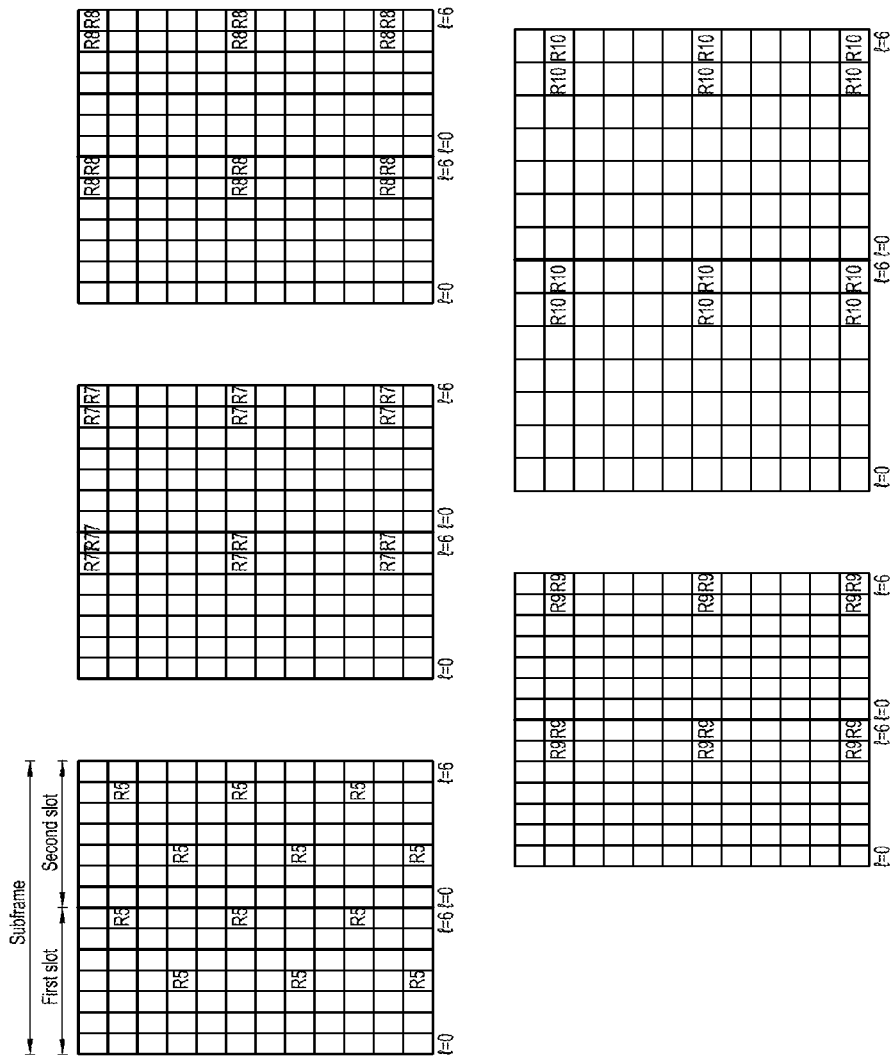
FIG. 10 illustrates an example of a resource block to which a demodulation RS is mapped.

FIG. 10 illustrates an example of a resource block to which a demodulation RS is mapped.

FIG. 10 illustrates REs used for a DM-RS in a normal CP structure. Rp is indicative of an RE used to send a DM-RS on an antenna port p. For example, R5 is indicative of an RE in which the DM-RS of an antenna port 5 is transmitted. Furthermore, referring to FIG. 10, the DM-RS of antenna ports 7 and 8 is transmitted through REs corresponding to the first, the sixth, and eleventh subcarriers (subcarrier index 0, 5, 10) of the sixth and the seventh OFDM symbols (OFDM symbol index 5, 6) of each slot. The DM-RS of the antenna ports 7 and 8 may be distinguished by an orthogonal sequence of length 2. The DM-RS of antenna ports 9 and 10 is transmitted through REs corresponding to the second, the seventh, and the twelfth subcarriers (subcarrier index 1, 6, 11) of the sixth and the seventh OFDM symbols (OFDM symbol index 5, 6) of each slot. The DM-RS of the antenna ports 9 and 10 may be distinguished by an orthogonal sequence of length 2. Furthermore, since S={7, 8, 11, 13} or S={9, 10, 12, 14}, the DM-RS of antenna ports 11 and 13 is mapped to REs to which the DM-RS of the antenna ports 7 and 8 is mapped, and the DM-RS of antenna ports 12 and 14 is mapped to REs to which the DM-RS of the antenna ports 9 and 10 is mapped.

The CSI-RS is transmitted through 1, 2, 4, or 8 antenna ports. In this case, the antenna ports used are p=15, p=15, 16, p=15, . . . , 18 and p=15, . . . , 22. The CSI-RS may be defined only for Δf=15 kHz. For the CSI-RS, reference may be made to Paragraph 6.10.3 of 3GPP TS 36.211 V10.4.0.

In the transmission of a CSI-RS, in order to reduce Inter-Cell Interference (ICI) in a multi-cell environment including a heterogeneous network (HetNet) environment, a maximum of different 32 configurations may be proposed. A CSI-RS configuration is different depending on the number of antenna ports within a cell and a CP. A neighboring cell may have a different configuration to the highest degree. Furthermore, a CSI-RS configuration may be divided into a case where it is applied to both a Frequency Division Duplex (FDD) frame and a Time Division Duplex (TDD) frame and a case where it is applied to only a TDD frame depending on a frame structure. A plurality of CSI-RS configurations may be used in a single cell. 0 or one CSI configuration may be used for UE assuming non-zero transmission power, and 0 or some CSI configurations may be used for UE assuming zero transmission power. UE does not send a CSI-RS in a special subframe of a TDD frame, a subframe in which the transmission of a CSI-RS collides against a synchronization signal, a physical broadcast channel (PBCH), SystemInformationBlockType1, and a subframe in which a paging message is transmitted. Furthermore, in a set S, that is, S={15}, S={15, 16}, S={17, 18}, S={19, 20} or S={21, 22}, an RE in which the CSI-RS of a single antenna port is transmitted is not used for the transmission of a PDSCH or the CSI-RS of another antenna port.

FIG. 11 illustrates an example of a resource block to which a CSI-RS is mapped.

FIG. 11 illustrates REs used for a CSI-RS in a normal CP structure. Rp is indicative of an RE used for the transmission of a CSI-RS on an antenna port p. Referring to FIG. 11, the CRI-RS of antenna ports 15 and 16 is transmitted through an RE corresponding to the third subcarrier (subcarrier index 2) of the sixth and the seventh OFDM symbols (OFDM symbol index 5, 6) of a first slot. The CRI-RS of antenna ports 17 and 18 is transmitted through an RE corresponding to the ninth subcarrier (subcarrier index 8) of the sixth and the seventh OFDM symbols (OFDM symbol index 5, 6) of the first slot. The CRI-RS of antenna ports 19 and 20 is transmitted through the same RE in which the CRI-RS of the antenna ports 15 and 16 is transmitted, and the CRI-RS of antenna ports 21 and 22 is transmitted through the same RE in which the CRI-RS of the antenna ports 17 and 18 is transmitted.

Meanwhile, a PDCCH is monitored in a limited region called a control region within a subframe. Furthermore, in order to demodulate a PDCCH, a CRS transmitted in the entire band is used. As the type of control information becomes diverse and the amount of control information is increased, the flexibility of scheduling through only an existing PDCCH is deteriorated. Furthermore, in order to reduce a burden attributable to the transmission of a CRS, an enhanced PDCCH (e ePDCCH) is introduced.

Figure 12:
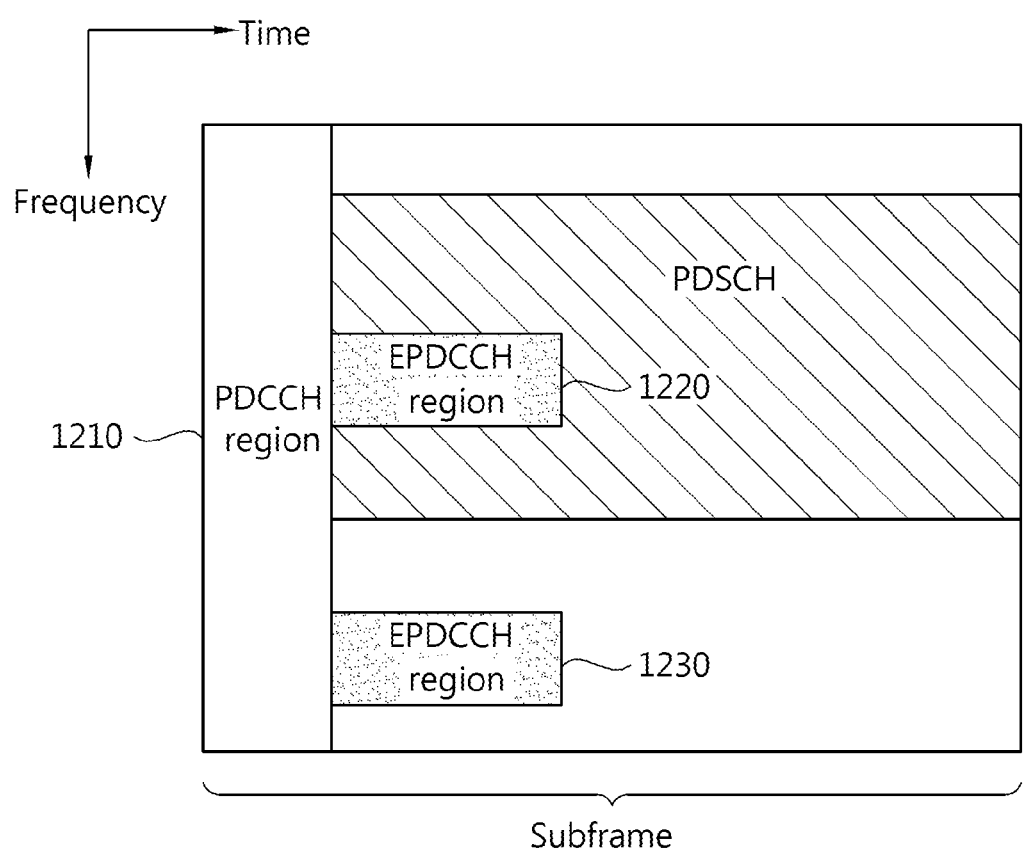
FIG. 12 illustrates an example of a subframe having an enhanced Physical Downlink Control CHannel (ePDCCH).

FIG. 12 illustrates an example of a subframe having an enhanced Physical Downlink Control CHannel (ePDCCH).

The subframe may include 0 or one PDCCH region 1210 and 0 or more ePDCCH regions 1220, 1230.

The ePDCCH regions 1220, 1230 are regions in each of which UE monitors an ePDCCH. The PDCCH region 1210 is placed within a maximum of four OFDM symbols of the former of a subframe, whereas the ePDCCH regions 1220, 1230 may be flexibly scheduled in OFDM symbols posterior to the PDCCH region 1210.

One or more ePDCCH regions 1220, 1230 may be assigned to UE, and the UE may monitor an ePDCCH in the assigned ePDCCH regions 1220, 1230.

A BS may inform UE of the number/position/size of the ePDCCH regions 1220, 1230 and/or information about a subframe in which an ePDCCH will be monitored through a Radio Resource Control (RRC) message.

In the PDCCH region 1210, a PDCCH may be demodulated based on a CRS. In the ePDCCH regions 1220, 1230, a DM-RS not a CRS may be defined in order to demodulate an ePDCCH. A corresponding DM-RS may be transmitted in corresponding ePDCCH regions 1220, 1230.

An RS sequence $r_{ns}(m)$ for a DM-RS is the same as Equation 1. In this case, m=0, 1, . . . , $12N_{RB}-1$, and $N_{RB}$ is a maximum number of RBs. A pseudo random sequence generator may be set to $c_{init}=(\text{floor}(ns/2)+1)(2N_{eDCCH,ID}+1)2^{16}+n_{ePDCCH,SCID}$ at the start of each subframe. ns is a slot number within a radio frame, $N_{ePDCCH,ID}$ is a cell index related to a corresponding ePDCCH region, and $n_{PDCCH,SCID}$ is a parameter given by higher layer signaling.

The ePDCCH regions 1220, 1230 may be used for scheduling for different cells. For example, an ePDCCH within the ePDCCH region 1220 may carry scheduling information for a first cell, and an ePDCCH within the ePDCCH region 1230 may carry scheduling information for a second cell.

When an ePDCCH is transmitted through multiple antennas in each of the ePDCCH regions 1220, 1230, the same precoding as that of the ePDCCH may be applied to a DM-RS within each of the ePDCCH regions 1220, 1230.

Compared to the case where a PDCCH uses a CCE as a transmission resource unit, a transmission resource unit for an ePDCCH is called an enhanced Control Channel Element (eCCE). An aggregation level may be defined as a resource unit that monitors an ePDCCH. For example, assuming that 1 eCCE is a minimum resource for an ePDCCH, an aggregation level L={1, 2, 4, 8, 16} may be defined.

Meanwhile, in accordance with a current LTE specification, all pieces of UE are configured to support a system bandwidth of a maximum of 20 MHz. That is, all pieces of UE are required to have a baseband processing capability that supports the bandwidth of 20 MHz. In order to reduce the hardware cost of UE and the consumption of a battery, a scheme for reducing a bandwidth supported by the UE may be taken into consideration. In particular, in the case of Machine Type Communication (MTC) UE, the size of transmitted data is small, and the transmission and reception of data are sometimes generated. Thus, a dominant view is that MTC UE will support a bandwidth narrower than 20 MHz, that is, a bandwidth supported by normal UE. In this case, if a serving cell has a system bandwidth that is the same as or narrower than a bandwidth supported by narrow-band UE, UE may perform wireless communication without significant changes.

In the present invention, it is assumed that a system bandwidth supported by a serving cell is greater than a bandwidth supported by UE that belongs to a new category, that is, narrow-band UE. Furthermore, UE that belongs to the new category is assumed to support a single bandwidth smaller than 20 MHz. For example, UE belonging to the narrow-band UE category may support only a bandwidth of 1.4 MHz (or 3 MHz). However, the bandwidth supported by the narrow-band UE preferably is greater than 1.4 MHz corresponding to 6 RBs.

Hereinafter, embodiments of the present invention are divided into three options depending on the system bandwidth of a serving cell assumed by narrow-band UE or an actual system bandwidth. Furthermore, MTC UE is described as an example, for convenience of description, but it does not mean that the present invention excludes application to UE in addition to MTC UE and it is evident that the present invention may be applied to other pieces of narrow-band UE.

<Option 1: The System Bandwidth of UE is Set Identically with the System Bandwidth of a BS>

In accordance with Option 1, a BS supports narrow-band UE without changing the system bandwidth of a serving cell. This is represented by Equation below.

$$N_{RB}^{DL}(\text{UE}) = N_{RB}^{DL}(\text{eNB})$$

$$N_{RB}^{DL}(\text{eNB}) = N_{RB}^{DL}(\text{UE}) \quad \quad \text{Equation 3}$$

In Equation 3, $N_{RB}^{DL}$(UE) means the system bandwidth of a serving cell that is assumed by narrow-band UE, and $N_{RB}^{DL}$ (eNB) means an actual system bandwidth.

In order for the changed system bandwidth of a serving cell to support narrow-band UE, random access and a PDCCH (or an ePDCCH) need to be redesigned. For example, a random access preamble, a random access response, and a Physical Random Access Channel (PRACH) in a random access process may be changed. Furthermore, the transmission of a System Information Block (SIB) may be changed.

Figure 13:
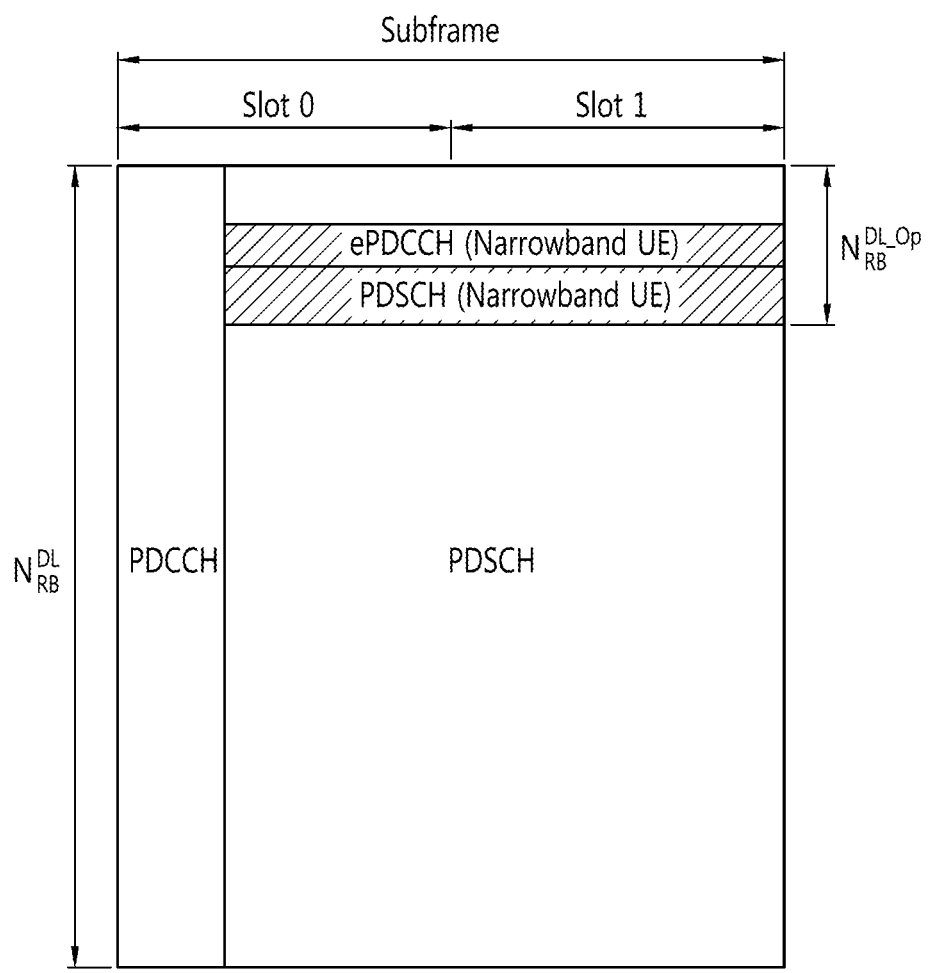
FIG. 13 illustrates an example of the structure of a downlink subframe in accordance with an embodiment of the present invention.

FIG. 13 illustrates an example of the structure of a downlink subframe in accordance with an embodiment of the present invention.

From FIG. 13, it may be seen that the operating bandwidth $N_{RB}^{DL\_Op}$ and system bandwidth $N_{RB}^{DL}$ of narrow-band UE have different values ($N_{RB}^{DL\_Op} \neq N_{RB}^{DL}$). For coexistence with the existing (legacy) UE, the existing PDCCH structure should not be changed. Accordingly, there is a need for an additional mechanism that allows narrow-band UE capable of decoding the existing PDCCH to obtain essential system information by performing cell search/selection.

For example, a BS may send system information through an ePDCCH for narrow-band UE. In this case, in order to decode the system information that is transmitted using a method different from that of an existing system, the narrow-band UE needs to be aware of whether the BS supports narrow-band UE. The BS may notify the narrow-band UE whether it is capable of supporting the narrow-band UE by sending a random access response, a PDCCH and/or an SIB.

In accordance with Option 1, existing UE and narrow-band UE may share a bandwidth. Accordingly, this may be called a name, such as bandwidth sharing.

<Option 2: A System Bandwidth is Limited to a Narrow Band>

In accordance with Option 2, a system bandwidth is changed (or controlled) into a narrow band through fragmentation/partition. That is, a single broadband is classified into a plurality of narrow bands, and at least one of the plurality of narrow bands may be the same as the operating bandwidth of narrow-band UE. This may be represented by Equation below.

$$N_{RB}^{DL}(UE) = N_{RB}^{DL\_Op}(UE)$$

$$N_{RB}^{DL\_Op}(eNB) = N_{RB}^{DL}(UE) \qquad \text{Equation 4}$$

In Equation 4, $N_{RB}^{DL}$(UE) means the system bandwidth of a serving cell assumed by narrow-band UE, $N_{RB}^{DL}$(eNB) means an actual system bandwidth, and $N_{RB}^{DL\_Op}$ means the operating bandwidth of narrow-band UE.

In this case, in order to support existing UE using a broadband, a CA mechanism may be applied. That is, a broadband may be implemented from a plurality of narrow bands by performing an intra-band CA. In accordance with Option 2, existing UE is assumed to have CA capabilities. In contrast, narrow-band UE may not have the CA capabilities.

Figure 14:
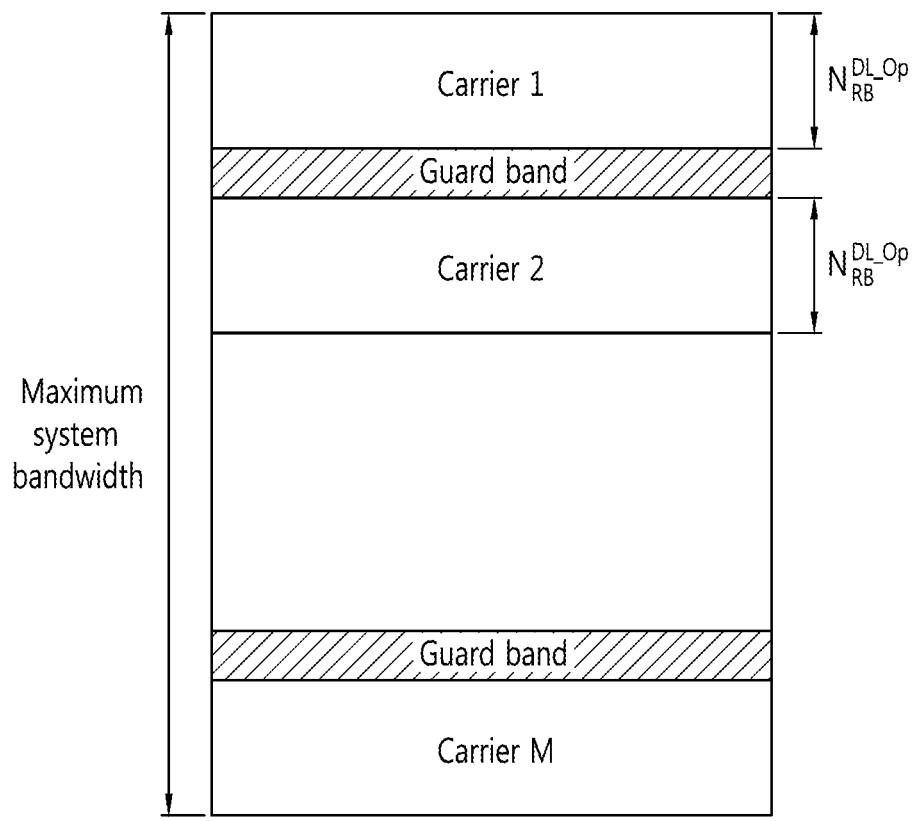
FIG. 14 illustrates an example of the structure of a downlink subframe in accordance with another embodiment of the present invention.

FIG. 14 illustrates an example of the structure of a downlink subframe in accordance with another embodiment of the present invention.

Referring to FIG. 14, in order to support existing UE using a broadband, the CA of a narrow band is performed. In accordance with such a method, a narrow band carrier is used to support narrow-band UE, and a broadband carrier generated by aggregating narrow band carriers is used to support existing broadband UE.

Meanwhile, in order to support each narrow band carrier, a guard band may be present between the narrow band carriers. However, great overhead may occur due to such a guard band and redundant synchronization/PBCH/SIB for each carrier. Accordingly, the aforementioned method has great significance in a communication system which uses a frequency carrier segmented into a plurality of narrow bands.

<Option 3: A BS Provides Two Cells having Different Bandwidths>

In accordance with Option 3, a BS may serve two cells of a broadband and a narrow band. That is, the BS generates an independent cell having a narrow-band system bandwidth in addition to an existing cell having a broadband system bandwidth. This is represented by Equation below.

$$N_{RB}^{DL}(UE) = N_{RB}^{DL\_Op}(UE)$$

$$\text{cell1}: N_{RB}^{DL}(eNB) = N_{RB}^{D}(eNB)$$

$$\text{cell2}: N_{RB}^{DL}(eNB) = N_{RB}^{DL\_Op}(UE) \qquad \text{Equation 5}$$

In Equation 5, $N_{RB}^{DL}$(UE) means the system bandwidth of a serving cell assumed by narrow-band UE, $N_{RB}^{DL}$(eNB) means an actual system bandwidth, and $N_{RB}^{DL\_Op}$ means the operating bandwidth of narrow-band UE.

Figure 15:
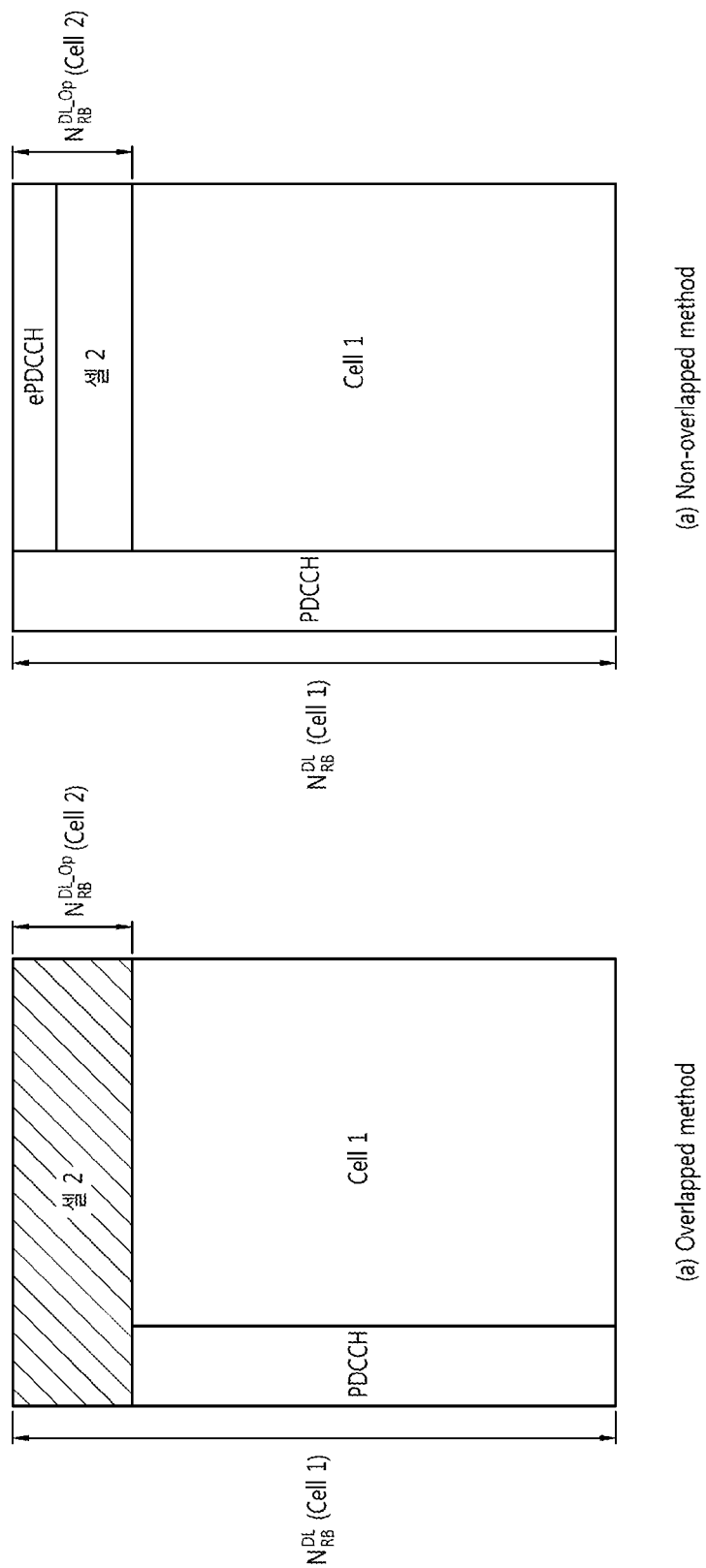
FIG. 15 illustrates an example of the structure of a downlink subframe in accordance with yet another embodiment of the present invention.

FIG. 15 illustrates an example of the structure of a downlink subframe in accordance with yet another embodiment of the present invention.

Referring to FIG. 15, a BS provides a first cell 1510 having a broadband system bandwidth and a second cell 1520 having a narrow-band system bandwidth, that is, two types of cells. The first cell and the second cell may share radio resources, and a method of sharing the radio resources may include an overlapped method and a non-overlapped method.

A subfigure (a) of FIG. 15 illustrates the overlapped method. In accordance with the overlapped method, the first cell and the second cell may share the same RE through multiplexing or a multi-user technology, and the PDCCHs of the first cell and the second cell are overlapped with each other.

A subfigure (b) of FIG. 15 illustrates the non-overlapped method. In accordance with the non-overlapped method, the second cell is not permitted to use an RE assigned to the PDCCH of the first cell.

In the overlapped method and the non-overlapped method, UE of the second cell, that is, narrow-band UE, is unable to use an existing PDCCH because the control channel of the second cell may be overlapped with the region of the PDCCH of the first cell. Accordingly, a BS may assign a control channel (e.g., an ePDCCH) for the narrow-band UE to the PDSCH region of the second cell. In this case, the index of the start symbol of the control channel for the narrow-band UE may be indicated by an SS/SSS or a PBCH, or may be set to be a default value or set through RRC.

In the overlapped method, narrow-band UE may use a PDCCH for narrow-band UE. That is, the narrow-band UE may use at least one former OFDM symbol that belongs to a plurality of OFDM symbols corresponding to the system bandwidth of a second cell within a subframe.

In the non-overlapped method, in order to indicate the position (or index) of the start symbol of a second cell region according to the system bandwidth of a first cell, a default value may be set. For example, if the system bandwidth of a first cell is 100 RBs, the index of the start symbol of a second cell region may be set to 4.

In accordance with Option 3, at least one narrow band cell coexisting with a broadband cell can be supported, which may be called a name, such as a virtual overlaid cell concept.

In accordance with Option 1 to Option 3, UE having a bandwidth narrower than a system bandwidth can be supported. Meanwhile, Option 1 has an advantage in that it is flexible, but has a disadvantage in that a current LTE specification needs to be greatly changed. Furthermore, Option 2 has an advantage in that it is the most simplest of the three options, but has a disadvantage in that it is unable to support broadband UE that does not support a CA, such as UE based on LTE Release 8. Furthermore, performance is low due to a guard band. Accordingly, Option 3, in particular, the non-overlapped method, is described in more detail below.

In order to implement the aforementioned method and to change the existing LTE specification to the minimum, the following conditions are required.

(1) A BS below LTE Release 11 needs to be able to support the aforementioned virtual overlaid cell concept. In the virtual overlaid cell concept, a plurality of cells in which frequencies are overlapped with each other so that both existing UE and narrow-band UE can be supported is supported. At least one broadband cell and at least one narrow band cell need to be supported. In this case, the center frequency of the narrow band cell must be different from that of the broadband cell. Furthermore, the narrow band cell does not need to be overlap with corresponding RBs because the transmission of the PSS/SSS/PBCH of the broadband cell is performed through central 6 RBs.

(2) ABS is able to support a plurality of narrow band cells within the same band, but is unable to support a plurality of broadband cells.

(3) Each of a broadband cell and a narrow band cell individually performs the transmission of a PSS/SSS/PBSCH in the central 6 RBs of each frequency domain using the virtual overlaid cell concept. Narrow-band UE may treat the narrow band cell as a regular cell having limited capabilities and behaviors.

(4) An SIB/paging message may be individually transmitted.

(5) Each cell needs to be scheduled as follows.

A BS is not allowed to assign a PDSCH for a broadband cell to an RE that shares the broadband cell and a narrow band cell.

A BS may assign an ePDDCH and/or a PDSCH for a narrow band cell to an RE that includes an OFDM symbol to which the PDCCH of a broadband cell is assigned, that is, at least one former OFDM symbol belonging to a plurality of OFDM symbols.

(6) Each cell is logically treated as a separate cell, but actual data transmission is performed through a single baseband circuit, that is, a single RF system. In other words, the data of each cell multiplexed and transmitted.

(7) A narrow band cell is unable to use at least one former OFDM symbol that belongs to a plurality of OFDM symbols in order to send data. Different pieces of scrambling classified based on a cell ID or other information of a Master Information Block (MIB) may be performed. The MIB may carry a Narrowband-Specific Cell (NSC) indicator. Narrow-band UE may determine a PDCCH or ePDCCH to be a control channel based on the indicator, and may determine the start position of the control channel.

(8) In order to schedule an SIB and paging information, the Common Search Space (CSS) of an ePDCCH is supported.

(9) The operation of existing UE is not changed.

An LTE specification changed in order to implement the virtual overlapped cell concept is described below.

Cell ID for Narrow Band Cell (1) Option 1: A Broadband Cell and a Narrow Band Cell Use a Common Cell ID If a common cell ID is used by both a broadband cell and a narrow band cell, the PSS/SSS sequence is the same and a CRS may be shared. In such a case, an NSC indicator may not be dependent on a cell ID. The NSC indicator may be indicated by another scrambling or MIB.

If another scrambling is used, narrow-band UE decodes an existing PBCH and decodes an NSC PBCH. That is, the narrow-band UE decodes the PBCH twice. A scrambling mechanism can prevent existing UE from being attached to an NSC. For example, the initial value of an NSC scrambling sequence may be set as in Equation 6.

$$c_{init} = cN_{ID}^{cell} \qquad \text{Equation 6}$$

In Equation 6, c is a specific constant.

Alternatively, an MIB data structure may be changed, or additional information may be added to an MIB. For example, the MIB may be defined as follows.

```
MasterInformationBlock ::=   SEQUENCE {
    Unused                   BIT STRING (size (5)) = '11111'
    dl-Bandwidth             ENUMERATED {
                                 n6, n15, n25, n50, n75, n100},
    phich-Config             PHICH-Config,
    systemFrameNumber        BIT STRING (SIZE (8)),
    NSC_Indication           ENUMERATED{
                                 TRUE, FALSE},
    spare                    BIT STRING (SIZE (4))
}
```

Hereinafter, an example of a changed MIB data structure is illustrated.

A field that is not used so that existing UE is unable to decode a DL bandwidth value may be inserted.

An NSC_Indication field may be inserted. The NSC_Indication field is directly or indirectly indicative of an NSC capability.

A changed part may correspond to 4 bits to 10 bits. If NSC_indication bits are not added, the changed part may correspond to 5 bits.

In accordance with a method of using scrambling or changing an MIB data structure, LTE 8 to 10 UE is unable to discover an NSC. Accordingly, existing UE excludes an NSC and performs monitoring and evaluation on a neighbor cell. Narrow-band UE handles an NSC like an existing cell. Accordingly, narrow-band UE performs monitoring and evaluation on a neighbor cell, including an NSC. The monitoring and evaluation on a neighbor cell that are performed by narrow-band UE may be determined depending on the three options.

1) Monitoring of both an existing cell and an NSC:

Narrow-band UE monitors an existing cell and an NSC regardless of a system bandwidth.

2) Monitoring of a narrow band cell of existing cells and an NSC

Narrow-band UE monitors an existing cell having a narrow system bandwidth and an NSC. The narrow system bandwidth may be the same as the system bandwidth of the NSC.

3) Monitoring of only an NSC

Narrow band UE monitors only an NSC.

The options may be configured through RRC signaling.

The significant advantage of a common cell ID is that the CRS of both a broadband cell and a narrow band cell can be shared. However, an RS sequence is generated so that it is distributed over the entire system bandwidth of a broadband cell. A k-th subcarrier index and a slot ns for a broadband cell and a complex-valued modulation symbol $\alpha_{k,l}^{(p)}$ of an l-th symbol in an antenna port p are as follows.

$$\alpha_{k,l}^{(p)} = r_{l,n_s}(m') \qquad \text{Equation 7}$$

In this case, $$k = 6m + (v + v_{shift}) \bmod 6$$
$$l = \begin{cases} 0, N_{symb}^{DL} - 3 & \text{if } p \in \{0,1\} \\ 1 & \text{if } p \in \{2,3\} \end{cases}$$
$$m = 0, 1, \ldots, 2 \cdot N_{RB}^{DL} - 1$$
$$m' = m + N_{RB}^{max,DL} - N_{RB}^{DL}$$

m is based on a broadband system bandwidth and a subcarrier index, and thus a narrow band cell need to be aware of the subcarrier index of the center frequency of the narrow band cell. To this end, an MIB may carry "s" related to a start subcarrier index, and UE related to an NCS may use m'=m+s. In this case, m=0, . . . , $2*N_{RB}^{DL\_Op} - 1$.

Meanwhile, the aforementioned method has a disadvantage in that a CRS may be decoded only after a PBCH is successfully decoded, which may limit the NSC search of UE.

Alternatively, blind detection that assumes s=0, 1, . . . $N_{RB}^{max,DL}$ may be performed. Blind detection requires many decoding attempts. In order to reduce the number of decoding attempts, a small number of "s", such as s=0, $N_{RB}^{DL\_Op}$, $2*N_{RB}^{DL\_Op}, \ldots, \lfloor N_{RB}^{max,DL}/N_{RB}^{DL\_Op} \rfloor * N_{RB}^{max,DL}$ may be assumed. If a start subcarrier for a narrow band cell is selected, a BS arranges the start position of the narrow band cell based on "s". This is represented by Equation below.

$$k = 6m + (v + v_{shift}) \bmod 6 \qquad \text{Equation 8}$$
$$l = \begin{cases} 0, N_{symb}^{DL} - 3 & \text{if } p \in \{0,1\} \\ 1 & \text{if } p \in \{2,3\} \end{cases}$$
$$m = 0, 1, \ldots, 2 \cdot N_{RB}^{DL\_Op} - 1$$
$$m' = m + s$$

(2) Option 2: A Broadband Cell and a Narrow Band Cell Use Respective Cell IDs

If an individual cell ID is used, the PSS/SSS/CRS sequences of the cells are different. This means that two different RS sequences are used in the same RE, and thus there is a problem in that a broadband cell is overlapped with a narrow band cell. Such a problem may have a bad influence on the Radio Resource Management (RRM) and CSI reporting of broadband UE. Accordingly, Option 2 is not preferred in that the capability of a broadband cell is limited.

Random Access Process of Narrow-Band UE for NCS

The random access process includes four pieces of message handshaking msg1, msg2, msg3, and msg4. msg1 means a random access request transmitted through a PRACH, msg2 means a random access response, and msg3 and msg4 are used for RRC connection. Assuming that narrow-band UE may be matched with an uplink transmission frequency based on prach-FreqOffset signaled through an SIB2 message, the UE may initialize a PRACH in a specific subframe in which the PRACH is permitted. The random access response msg2 may be scheduled through an ePDCCH. The ePDCCH may be searched for based on an RA-RNTI.

Figure 16:
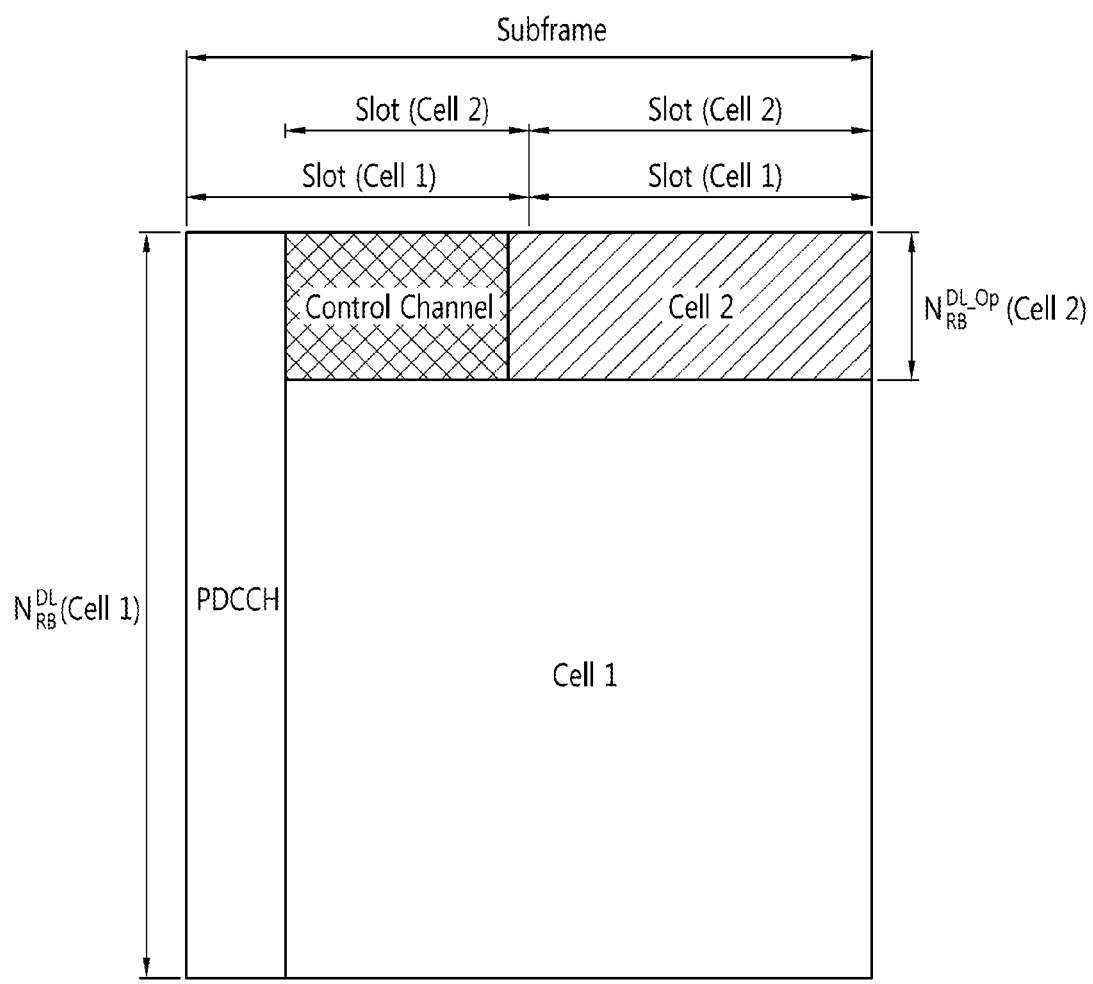
FIG. 16 illustrates an example of the structure of a downlink subframe in accordance with yet another embodiment of the present invention.

FIG. 16 illustrates an example of the structure of a downlink subframe in accordance with yet another embodiment of the present invention.

Referring to FIG. 16, an NSC may design a control channel that has the same shape as an ePDCCH. In this case, the MIB of the NSC may include information about which control channel has been used. If a control channel of a new type is used, essential parameters for decoding the control channel may be transmitted through system information.

A default parameter for an MIB or SIB½ may be defined. For example, for the default parameter, an antenna port, a search space, transmission (TM) mode, etc. may be fixedly set.

msg3 and msg4 are similar to those defined in the current LTE specification. However, the transmission of an UL grant and ACK/NACK may be performed through an ePDCCH. The same concept may be applied to a New Carrier Type (NCT) not including a PDCCH, and an ePDCCH may be started from the first OFDM symbol of each subframe except an MBSFN subframe.

MBSFN

An NSC reserves an MBSFN subframe configured by a broadband cell. That is, the NSC, together with the broadband cell, shares the same MBSFN configuration. The NSC does not send any data in the MBSFN subframe, and narrow-band UE attached to the NSC does not receive any data in the MBSFN subframe.

Radio Link Management (RLM)/RRM Measurement

If a broadband cell and an NSC use a common cell ID, narrow-band UE may perform RRM measurement on the system bandwidth of the NSC. The power of the CRS of the entire broadband subframe is the same. Narrow-band UE may perform RLM/RRM measurement on an NSC using a method similar to that of an existing cell having a narrow system bandwidth.

CSI Measurement/Report

Narrow-band UE may perform CSI measurement/report on the system bandwidth of an NSC using a method similar to that of RLM/RRM measurement.

TDD Configuration

A broadband cell and an NSC have the same TDD configuration as an existing cell.

Uplink Pairing

Figure 17:
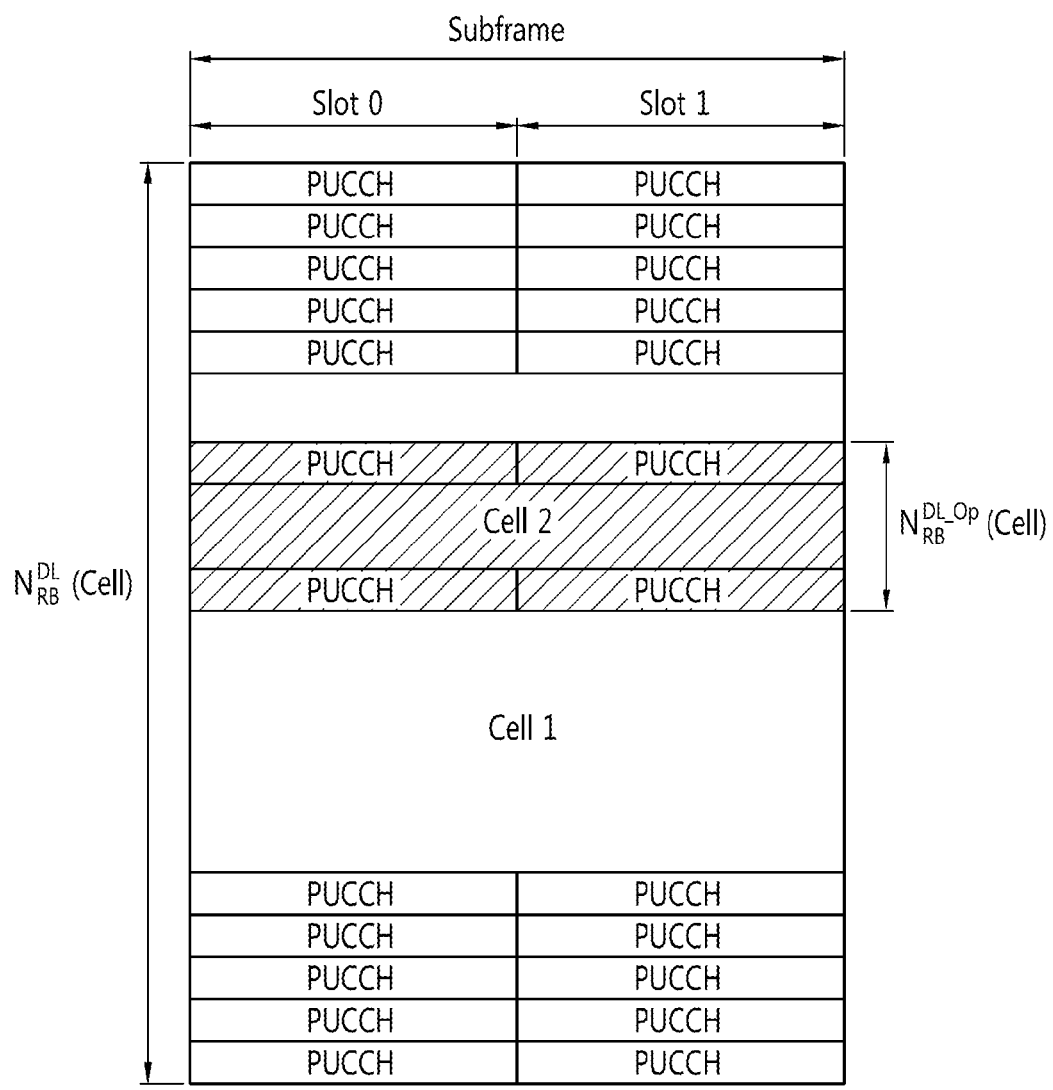
FIG. 17 illustrates an example of the structure of an uplink subframe in accordance with an embodiment of the present invention.

FIG. 17 illustrates an example of the structure of an uplink subframe in accordance with an embodiment of the present invention. Referring to FIG. 17, the uplink pair of a broadband cell and an NSC may share resources. The uplink of the NCS may be assigned near the center frequency in order to avoid a collision with the PUCCH region of the broadband cell.

Control of Uplink Power

Control of uplink power defined in LTE Release 10 may also be applied to uplink transmission paired with an NSC.

Control of Downlink Power

All parameters related to power control may be shared between a broadband cell and a narrow band cell, and include referenceSignalPower.

Since $\rho_A$ or $\rho_B$ are specific to UE, an NSC may configure $\rho_A$ or $\rho_B$ regardless of a rule (for this rule, reference may be made to Paragraph 5.2 of 3GPP TS 36.213 V10.4.0 (2011-12) "Technical Specification Group Radio Access Network; Evolved Universal Terrestrial Radio Access (E-UTRA); Physical layer procedures (Release 10)") applied to a broadband cell.

In contrast, cell-specific power control of an NSC is dependent on a broadband cell.

Figure 18:
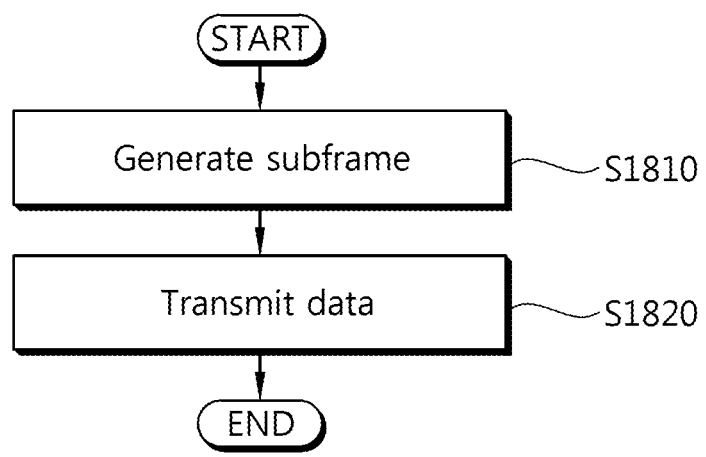
FIG. 18 is a flowchart illustrating a method of sending downlink data in accordance with an embodiment of the present invention.

FIG. 18 is a flowchart illustrating a method of sending downlink data in accordance with an embodiment of the present invention.

A BS generates a downlink subframe including a first control channel and a second control channel (S1810). As described above, the virtual overlaid cell concept may be introduced so that a BS may support a broadband cell having a wide frequency bandwidth and a narrow band cell having a good frequency bandwidth. The first control channel may mean a control channel for a broadband cell having a wide frequency band, and the second control channel may mean a control channel for a narrow band cell having a narrow frequency band. In this case, the frequency band of the narrow band cell includes part of the frequency band of the broadband cell. For example, the frequency bandwidth of the broadband cell may be 20 MHz, and the frequency bandwidth of the narrow band cell may be 1.4 MHz.

The broadband cell and the narrow band cell may use the same cell ID and CRS. In such a case, the first control channel and the second control channel are decoded using the CRS.

Meanwhile, as described above, a method of assigning resources for a first cell and a second cell includes the overlapped method and the non-overlapped method. The first control channel may mean a PDCCH of the current LTE specification, and may be assigned to at least one former OFDM symbol of a plurality of OFDM symbols in a downlink subframe. The second control channel may be assigned to some of OFDM symbols placed in a second frequency band. In order to avoid overlapping with the first control channel, the second control channel may be assigned to some of the remainder of a plurality of the OFDM symbols placed in the second frequency band other than at least one former OFDM symbol.

The BS sends downlink data through the generated downlink subframe (S1820).

Figure 19:
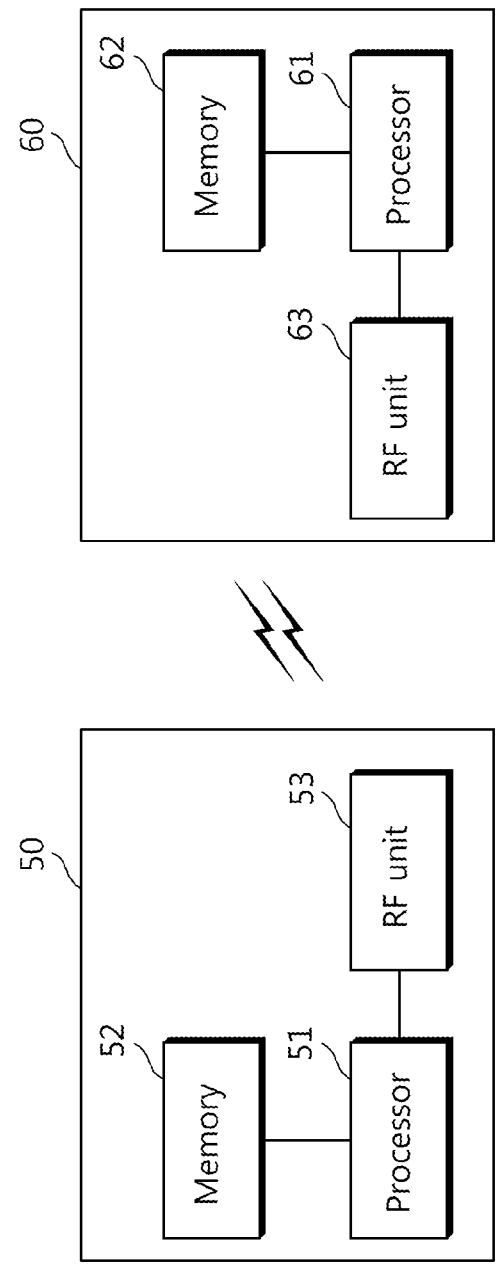
FIG. 19 is a block diagram illustrating a wireless communication system in which an embodiment of the present invention is implemented.

FIG. 19 is a block diagram illustrating a wireless communication system in which an embodiment of the present invention is implemented.

A BS 50 includes a processor 51, memory 52, and a Radio Frequency (RF) unit 53. The memory 52 is connected to the processor 51, and stores a variety of pieces of information for driving the processor 51. The RF unit 53 is connected to the processor 51, and sends and/or receives radio signals. The processor 51 implements the proposed functions, processes and/or methods. In the aforementioned embodiments, the operation of the BS may be implemented by the processor 51.

UE 60 includes a processor 61, memory 62, and an RF unit 63. The memory 62 is connected to the processor 61, and stores a variety of pieces of information for driving the processor 61. The RF unit 63 is connected to the processor 61, and sends and/or receives radio signals. The processor 61 implements the proposed functions, processes and/or methods. In the aforementioned embodiments, the operation of the UE may be implemented by the processor 61.

The processor may include Application-Specific Integrated Circuits (ASICs), other chipsets, logic circuits and/or data processors. The memory may include Read-Only Memory (ROM), Random Access Memory (RAM), flash memory, memory cards, storage media and/or other storage devices. The RF unit may include baseband circuits for processing radio signals. When an embodiment is implemented in software, the above scheme may be implemented using a module (process or function) that performs the above functions. The module may be stored in the memory and executed by the processor. The memory may be placed inside or outside the processor, and may be connected to the processor by a variety of well-known means.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

What is claimed is:

1. A method for transmitting downlink data in a wireless communication system, the method comprising:
  generating a downlink subframe comprising a first control channel for a first cell having a first frequency band and a second control channel for a second cell having a second frequency band,
  wherein the first control channel is a physical downlink control channel (PDCCH) and the second control channel is an enhanced PDCCH (ePDCCH),
  wherein the first control channel is assigned within a control region of both the first and second frequency hands, and the second control channel is assigned within a data region of the second frequency band,
  wherein the second cell is not permitted to use one or more resource elements (REs) assigned to the first control channel,
  wherein an index of the starting orthogonal frequency division multiplexing (OFDM) symbol of the second control channel is indicated by at least one of a primary synchronization signal/secondary synchronization signal (PSS/SSS) sequence, a physical broadcast channel/master information block (PBCH/MIB), and a default value,
  wherein the index of the starting OFDM symbol is configured via a radio resource control (RRC) signaling, and
  wherein a size of the first frequency band is 20 MHz and a size of the second frequency band is 1.4 MHz; and
  transmitting downlink data through the downlink subframe.

2. The method of claim 1, wherein the first cell and the second cell have same cell identifiers.

3. The method of claim 2, wherein the first control channel and the second control channel are decoded using same cell-specific reference signal.

4. A base station in a wireless communication system, the base station comprising:
  a radio frequency unit configured to transmit radio signals; and
  a processor connected to the RF unit and configured to:
    generate a downlink subframe comprising a first control channel for a first cell having a first frequency band and a second control channel for a second cell having a second frequency band,
  wherein the first control channel is a physical downlink control channel (PDCCH) and the second control channel is an enhanced PDCCH (ePDCCH),
  wherein the first control channel is assigned within a control region of both the first and second frequency bands, and the second control channel is assigned within a data region of the second frequency band,
  wherein the second cell is not permitted to use one or more resource elements (REs) assigned to the first control channel, wherein an index of the starting orthogonal frequency division multiplexing (OFDM) symbol of the second control channel is indicated by at least one of a primary synchronization signal/secondary synchronization signal (PSS/SSS) sequence, a physical broadcast channel/master information block (PBCH/MIB), and a default value, wherein the index of the starting OFDM symbol is configured via a radio resource control (RRC) signaling, and wherein a size of the first frequency band is 20 MHz and a size of the second frequency band is 1.4 MHz, and transmit downlink data through the downlink subframe.

5. The base station of claim 4, wherein the first cell and the second cell have same cell identifiers.

\* \* \* \* \*